US010277683B2

(12) United States Patent
Abuan et al.

(10) Patent No.: US 10,277,683 B2
(45) Date of Patent: Apr. 30, 2019

(54) MULTIFUNCTIONAL DEVICES AS VIRTUAL ACCESSORIES

(71) Applicant: Apple Inc., Cupertino, CA (US)

(72) Inventors: Joe S. Abuan, San Jose, CA (US); Barry A. Whitebook, Charles Town, WV (US); Berkat S. Tung, Rancho Cordova, CA (US); Jonathan J. Bennett, San Francisco, CA (US); Graeme J. Devine, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 831 days.

(21) Appl. No.: 14/737,278

(22) Filed: Jun. 11, 2015

(65) Prior Publication Data
US 2015/0280986 A1    Oct. 1, 2015

Related U.S. Application Data

(63) Continuation of application No. 12/479,586, filed on Jun. 5, 2009, now abandoned.
(Continued)

(51) Int. Cl.
*H04L 12/24* (2006.01)
*H04L 29/08* (2006.01)
(Continued)

(52) U.S. Cl.
CPC ............ *H04L 67/141* (2013.01); *H04W 4/008* (2013.01); *H04W 4/203* (2013.01); *H04W 4/80* (2018.02);
(Continued)

(58) Field of Classification Search
CPC ........ A63F 13/12; A63F 13/10; A63F 13/358; A63F 2300/407; A63F 2300/5546;
(Continued)

(56) References Cited

U.S. PATENT DOCUMENTS 5,618,045 A    4/1997 Kagan et al.
5,794,446 A    8/1998 Earley et al.
(Continued)

FOREIGN PATENT DOCUMENTS

CN    1522503    8/2004
EP    1494432    1/2005
(Continued)

OTHER PUBLICATIONS

Office Action for Chinese Application No. 201010134544.9 dated Feb. 16, 2012, 9 pages.
(Continued)

*Primary Examiner* — Jungwon Chang
(74) *Attorney, Agent, or Firm* — Womble Bond Dickinson (US) LLP

(57) ABSTRACT

At least certain embodiments of the present disclosure include a framework for turning one or more multifunctional devices coupled to a personal area network (PAN) into virtual accessories of another multifunctional device coupled to the PAN. In one embodiment, connection between a multifunctional device and a PAN is established, where the PAN is further coupled to a set of multifunctional devices. One or more distributed functionalities associated with a multi-device capable application are assigned to each multifunctional device based on relationship between the multifunctional devices. At least part of the multi-device capable application is shared between the multifunctional devices. Using the multifunctional device, the one or more distributed functionalities are performed in collaboration with the other multifunctional devices.

25 Claims, 19 Drawing Sheets

Related U.S. Application Data

(60) Provisional application No. 61/160,683, filed on Mar. 16, 2009.

(51) Int. Cl.
*H04W 4/80* (2018.01)
*H04W 4/00* (2018.01)
*H04W 4/20* (2018.01)
*H04L 12/58* (2006.01)
*A63F 13/335* (2014.01)
*A63F 13/34* (2014.01)

(52) U.S. Cl.
CPC ............ *A63F 13/335* (2014.09); *A63F 13/34* (2014.09); *A63F 2300/407* (2013.01); *H04L 41/5058* (2013.01); *H04L 51/04* (2013.01)

(58) Field of Classification Search
CPC ............ A63F 2300/8082; A63F 13/335; A63F 13/34; H04L 61/1511; H04L 65/403; H04L 67/141; H04L 41/5058; H04L 51/04; G06Q 10/10; H04W 4/80; H04W 4/008; H04W 4/203
USPC ...... 709/228, 204–206; 704/258; 463/16, 42
See application file for complete search history.

(56) References Cited

U.S. PATENT DOCUMENTS

| | | |
|---|---|---|
| 5,852,661 A | 12/1998 | Chen |
| 6,463,078 B1 | 10/2002 | Engstrom et al. |
| 6,523,108 B1 | 2/2003 | James et al. |
| 6,793,580 B2 | 9/2004 | Sinclair et al. |
| 6,867,965 B2 | 3/2005 | Khoo |
| 6,898,637 B2 | 5/2005 | Curtin |
| 7,097,562 B2 | 8/2006 | Gagner |
| 7,103,313 B2 | 9/2006 | Heinonen et al. |
| 7,133,896 B2 | 11/2006 | Ogdon et al. |
| 7,171,475 B2 | 1/2007 | Weisman et al. |
| 7,249,182 B1 | 7/2007 | Heinonen et al. |
| 7,333,464 B2 | 2/2008 | Yang et al. |
| 7,415,711 B2 | 8/2008 | Chew et al. |
| 7,491,123 B2 | 2/2009 | Smith et al. |
| 7,827,139 B2 | 11/2010 | Schauser et al. |
| 7,831,673 B1 | 11/2010 | Cohen et al. |
| 7,841,525 B1 | 11/2010 | Zhou |
| 8,303,421 B1 | 11/2012 | Farley |
| 8,311,197 B2 | 11/2012 | Shaffer et al. |
| 2002/0021903 A1 | 2/2002 | Ito et al. |
| 2002/0120750 A1 | 8/2002 | Nidd |
| 2002/0147777 A1 | 10/2002 | Hackbarth et al. |
| 2003/0037033 A1 | 2/2003 | Nyman et al. |
| 2003/0069921 A1 | 4/2003 | Lamming et al. |
| 2003/0177187 A1 | 9/2003 | Levine et al. |
| 2003/0229900 A1 | 12/2003 | Reisman |
| 2004/0001480 A1* | 1/2004 | Tanigawa ............ H04L 12/1827 370/352 |
| 2004/0003039 A1 | 1/2004 | Humphrey et al. |
| 2004/0076136 A1 | 4/2004 | Beach |
| 2004/0087274 A1 | 5/2004 | Ekberg et al. |
| 2004/0122957 A1 | 6/2004 | Edwards et al. |
| 2004/0172626 A1 | 9/2004 | Jalan et al. |
| 2004/0253923 A1 | 12/2004 | Braley et al. |
| 2004/0267876 A1 | 12/2004 | Kakivaya et al. |
| 2005/0071845 A1 | 3/2005 | Kallio et al. |
| 2005/0088980 A1 | 4/2005 | Olkkonen et al. |
| 2005/0138173 A1 | 6/2005 | Ha et al. |
| 2005/0232242 A1 | 10/2005 | Karaoguz et al. |
| 2006/0039354 A1 | 2/2006 | Rao et al. |
| 2006/0068702 A1 | 3/2006 | Miwa et al. |
| 2006/0068911 A1 | 3/2006 | Pirich et al. |
| 2006/0073869 A1 | 4/2006 | LeMay et al. |
| 2006/0190715 A1 | 8/2006 | Miller |
| 2006/0215601 A1 | 9/2006 | Vleugels et al. |
| 2006/0287099 A1* | 12/2006 | Shaw ............. A63F 13/12 463/42 |
| 2007/0042807 A1 | 2/2007 | Khoo |
| 2007/0060305 A1 | 3/2007 | Amaitis et al. |
| 2007/0073899 A1 | 3/2007 | Judge et al. |
| 2007/0117635 A1 | 5/2007 | Spanton et al. |
| 2007/0130253 A1 | 6/2007 | Newson et al. |
| 2007/0155326 A1 | 7/2007 | Lin et al. |
| 2007/0155505 A1 | 7/2007 | Huomo |
| 2007/0195760 A1 | 8/2007 | Rahman et al. |
| 2007/0218997 A1* | 9/2007 | Cho ............. A63F 13/12 463/42 |
| 2007/0264991 A1 | 11/2007 | Jones et al. |
| 2008/0003946 A1 | 1/2008 | Lee et al. |
| 2008/0009344 A1 | 1/2008 | Graham et al. |
| 2008/0014951 A1 | 1/2008 | Laroia et al. |
| 2008/0220878 A1 | 9/2008 | Michaelis |
| 2008/0233971 A1 | 9/2008 | Panabaker et al. |
| 2008/0291916 A1 | 11/2008 | Xiong et al. |
| 2008/0320041 A1 | 12/2008 | Engelsma et al. |
| 2009/0005141 A1 | 1/2009 | Lehtiniemi et al. |
| 2009/0005167 A1 | 1/2009 | Arrasvuori et al. |
| 2009/0184821 A1 | 1/2009 | Kuris et al. |
| 2009/0063686 A1 | 3/2009 | Schmidt et al. |
| 2009/0104956 A1 | 4/2009 | Kay et al. |
| 2009/0113482 A1 | 4/2009 | Kawada et al. |
| 2009/0132935 A1 | 5/2009 | Van Zwol |
| 2009/0135805 A1 | 5/2009 | Lee et al. |
| 2009/0141692 A1 | 6/2009 | Kasslin et al. |
| 2009/0197681 A1* | 8/2009 | Krishnamoorthy ..... A63F 13/12 463/42 |
| 2009/0265661 A1 | 10/2009 | Shuster |
| 2009/0291763 A1 | 11/2009 | Guo et al. |
| 2009/0305778 A1 | 12/2009 | Yu et al. |
| 2009/0325709 A1* | 12/2009 | Shi ............. G06Q 10/10 463/42 |
| 2010/0009756 A1 | 1/2010 | Burckart et al. |
| 2010/0041457 A1* | 2/2010 | Cook ............. A63F 13/12 463/16 |
| 2010/0145701 A1* | 6/2010 | Kaneko ............. A63F 13/10 704/258 |
| 2010/0222147 A1* | 9/2010 | Langan ............. A63F 13/12 463/42 |
| 2010/0233960 A1 | 9/2010 | Tucker et al. |
| 2010/0235523 A1* | 9/2010 | Garcia ............. H04L 12/1822 709/228 |
| 2010/0235525 A1* | 9/2010 | McGuire ............. H04L 61/1511 709/228 |
| 2014/0047413 A1 | 2/2014 | Sheive et al. |

FOREIGN PATENT DOCUMENTS

| | | |
|---|---|---|
| EP | 2293 517 | 3/2011 |
| GB | 2415325 | 12/2005 |
| JP | 2002055896 | 2/2002 |
| JP | 2007110186 | 4/2007 |
| JP | 2008097297 | 4/2008 |
| JP | 2008211507 | 9/2008 |
| WO | WO-02/059752 | 8/2002 |
| WO | WO-03003610 | 1/2003 |
| WO | WO-03/029966 | 4/2003 |
| WO | WO-2007136622 | 11/2007 |
| WO | WO-2010107703 | 9/2010 |
| WO | WO-2011/031354 | 3/2011 |

OTHER PUBLICATIONS

PCT International Preliminary Report on Patentability from PCT/US2010/036490 dated Mar. 22, 2012, 8 pages.
Office Action for European Application No. 10156166.0 dated Apr. 11, 2012, 5 pages.
Office Action for U.S. Appl. No. 12/687,814 dated Oct. 5, 2011, 15 pages.
Final Office Action for U.S. Appl. No. 12/687,814 dated Feb. 15, 2012, 15 pages.
Notice of Allowance for U.S. Appl. No. 12/687,814 dated Jun. 12, 2012, 16 pages.

(56) References Cited

OTHER PUBLICATIONS

Office Action for U.S. Appl. No. 12/405,130 dated Jun. 4, 2012, 11 pages.
International Preliminary Report on Patentability from PCT/US2010/027334 dated Sep. 29, 2011, 11 pages.
Office Action with English Translation for Japanese Patent Application No. 2010-86508, dated Dec. 23, 2011, 10 pages.
"Search Report and Examination Report" for European Patent Application No. 1003995.6, dated Jun. 23, 2010, 3 pages.
"European Search Report" for European Patent Application No. 10156166.01-1244, dated Aug. 9, 2010, 6 pages.
"International Search Report and Written Opinion" for PCT/US2010/025445, dated Apr. 16, 2010, 8 pages.
"PCT International Preliminary Report on Patentability" for PCT/US2010/027334 dated Sep. 20, 2011 filed Mar. 15, 2010, 11 pages.
"PCT International Preliminary Report on Patentability" for PCT/US2010/025445, dated Sep. 29, 2011, 6 pages.
"International Search Report and Written Opinion" for PCT/US2010/027334, dated Oct. 26, 2010, 22 pages.
International Search Report and Written Opinion dated Oct. 26, 2010, for International Application No. PCT/US2010/027334, filed Mar. 15, 2010.
United Kingdom Combined Search and Examination Report for United Kingdom Application No. GB10039953.6, dated Jun. 23, 2010, 3 pages.
European Search Report for European application No. EP10156166.0, dated Aug. 9, 2010, 6 pages.
International Search Report and Written Opinion for international application No. PCT/US10/25445, dated Apr. 16, 2010, 8 pages.
Faller, Christof et al., "Robust Acoustic Echo Control Using a Simple Echo Path Model," Audiovisual Communications Laboratory, EPFL, Lausanne, Switzerland, 2006, 4 pages.
"International Search Report and Written Opinion", for PCT/US2010/027334 dated Oct. 26, 2010., (Oct. 26, 2010), 22 pages.
"Jini Architecture Specification", XP-002279289, Sun Microsystems, Internet citation—www.sun.com/software/jini/specs/index, retrieved on May 4, 2004, (Dec. 31, 2001), 26 pages.
Al-Masri, Eyhab, et al., "Enhancing the Discovery of Mobile Services", XP002587025, WWW 2008, Beijing, China, Apr. 21-25, 2008, (Apr. 21, 2008), 10 pages.
Kozierok, Charles M., "The TCP/IP Guide: DNS Name Notation and Message Compression Technique", Kozierok, Charles M. "The TCP/IP Guide: DNS Name Notation and Message Compression Technique," Jun. 21, 2008, downloaded from http://web.archive.org/web/20080621054323/http://www.tcpipguide.com/free/t_DNSNameNotationand_MessageCompressionTechnique-2.htm Jun. 2, 2008 (Jun. 21, 2008), 2 pages.
Phua, Kia M., et al., "A Web-based Internet Java Phone for Real-Time Voice Communication", XP-002965615, World Wide Web 3 (2000) 193-203, vol. 3, Jan. 1, 2000, ISSN: 1386-145X, DOI: 10.1023/A:1019298100614, Baltzer Science Publishers BV, (Jan. 1, 2000), 193-203 pages.
Preuss, Stephan, et al., "Jesa Service Directory Protocol Efficient Service Discovery in Ad-Hoc Networks", Preuss, Stephan "JESA Service Directory Protocol Efficient Service Discovery in Ad-Hoc Networks," Networking 2002: Networking Technologies, Services, and Protocols; Performance of Computer Networks; Moblie and Wireless Communications, Lecture Notes in Comp, (May 19, 2002).
Sacramento, Vagner, et al., "MoCA: A Middleware for Developing Collaborative Applications for Mobile Users", IEEE Distributed Systems Online ISSN:1541-4922 Published by the IEEE Computer Society, vol. 5, No. 10, Oct. 2004, New York, NY, XP011121803,, (Oct. 1, 2004), 14 pages.
Sedov, Igor, et al., "Time and Energy Efficient Service Discovery in Bluetooth", Sedov, Igor et al., "Time and Energy Efficient Service Discovery in Bluetooth," VTC 2003—Spring, The 57th IEEE Semiannual Vehicular Technology Conference, Proceedings, Jeju, Korea, Apr. 22-25, 2003, IEEE Vehicular Technology Conference, IEEE, vol. 1, Ap, (Apr. 22, 2003), 418-422.
Sukkar, Rafid A., "Echo Detection and Delay Estimation Using a Pattern Recognition Approach and Cepstral Correlation", XP-002481308, ICASSP 2007, vol. 4, 1-4244-0728-1/07, IEEE, Apr. 15, 2007, (Apr. 15, 2007), pp. 909-912.
Wikipedia, Bonjour (software), http://en.wikipedia.org/wiki/Bonjour (software), Mar. 6, 2009, 5 pages.
Wikipedia, Echo suppressor, http://en.wikipedia.org/wiki/Echo_suppressor, Mar. 6, 2009, 2 pages.
Wikipedia, NAT traversal, http://en.wikipedia.org/wiki/NAT_traversal, Mar. 6, 2009, 3 pages.

* cited by examiner

MULTIFUNCTIONAL DEVICES AS VIRTUAL ACCESSORIES

CROSS REFERENCED TO RELATED APPLICATIONS

This application is a continuation of co-pending U.S. application Ser. No. 12/479,586, filed on Jun. 5, 2009, which claims the benefit of U.S. Provisional Patent Application No. 61/160,683, filed on Mar. 16, 2009, which is herein incorporated by reference in its entirety. This application is also related to prior U.S. patent application Ser. No. 12/405,130, filed on Mar. 16, 2009, which is herein incorporated by reference in its entirety; and to concurrently filed U.S. patent application Ser. No. 12/479,745 entitled "A Framework for Supporting Multi-Device Collaboration," filed on Jun. 5, 2009, which is herein incorporated by reference in its entirety.

FIELD OF THE DISCLOSURE

This disclosure relates to a framework for making multifunctional devices to be virtual accessories of another multifunctional device.

COMPUTER PROGRAM LISTING

A portion of the disclosure of this patent document contains material, which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

Applicant has submitted herewith Computer Program Listings, which are included as Appendix A, attached.

BACKGROUND OF THE DISCLOSURE

Various devices such as electronic devices, computing systems, portable devices, and handheld devices have software gaming applications. These devices can network with each other for a multiplayer gaming experience. Although these devices may exchange data among themselves during the course of running a gaming application, these devices do not collaborate with each other in the processing of the gaming application. For example, a subset of these devices may receive user inputs to the gaming application, and then forward the user inputs to another one of these devices, which processes the user inputs forwarded according to instructions of the gaming application.

However, the above conventional approach is limited because the configuration of these devices typically cannot be changed during the course of the running the game application. Furthermore, the processing capability or resource is limited to what is available on one of these devices because these devices do not collaborate with each other in the processing of the gaming application. Another shortfall of the above conventional approach is that these devices have to be connected to each other prior to sharing the game.

SUMMARY OF THE DESCRIPTION

At least certain embodiments of the present disclosure include one or more application programming interfaces in an environment with software interacting with one or more software applications. Various function calls or messages are transferred via the application programming interfaces between the software and software applications. Example application programming interfaces transfer function calls that support multi-device collaboration (e.g., music creation, document creation, multi-player games, etc.) and voice chat operations.

At least certain embodiments of the present disclosure include a method for operating through an application programming interface (API). The method includes transferring a function call to create a session object. The function call specifies a mode of the session object, a service type, and a name. The method further includes advertising the service type and the service name. The service name can include a truncated name, a unique identification, and a state of service of a software application. The service type and the service name can be advertised prior to setting up a communication channel between the two devices, so another user can determine from the service type or the service name whether to set up the communication channel.

Some embodiments of the present disclosure include a method for making a multifunctional device a virtual accessory of another multifunctional device. Some examples of the multifunctional device include portable media players (e.g., iPod® media players and iPhone® from Apple, Inc. of Cupertino, Calif.). In one embodiment, a connection between a multifunctional device and a personal area network (PAN) is established, where the PAN is further coupled to one or more multifunctional devices. One or more distributed functionalities associated with a multi-device capable application (e.g., a multi-device gaming application) are assigned to each multifunctional device based on relationship between the multifunctional devices. At least part of the multi-device capable application is shared between the multifunctional devices. To share the multi-device capable application, all or part of the multi-device capable application may be previously installed on all multifunctional devices in the PAN. Alternatively, one or more of the multifunctional devices may transmit all or part of the multi-device capable application to the other multifunctional devices in the PAN in order to share the multi-device capable application. Using the multifunctional device, the one or more distributed functionalities are performed in collaboration with the other multifunctional devices. In one example, a portable media player is connected to a PAN, which subsequently discovers another portable media player connected to the PAN using a discovery tool (e.g., Bonjour from Apple, Inc. of Cupertino, Calif.). Both media players support the same multi-device gaming application, and thus, they connect to each other to collaborate with each other in executing the multi-device gaming application. Each of the media players may sign up for a particular role and be responsible for one or more distributed functionalities (e.g., providing a user input interface) in executing the multi-device gaming application. For instance, one of the media player may sign up to be the left side of the user input interface (e.g., a piano keyboard) and the other media player may sign up to be the right side of the user input interface. Both media players may run the multi-device gaming application substantially simultaneously to generate their respective part of the user input interface. The media players may also communicate the user input received via their respective parts of the user input interface to each other over the PAN.

In some embodiments, the number of multifunctional devices involved in these methods may be greater than two. Various devices which perform one or more of the foregoing methods and machine-readable media which, when executed by a processing system, cause the processing system to perform these methods, are also described.

Other methods, devices and machine-readable media are also described.

BRIEF DESCRIPTION OF THE DRAWINGS

The disclosure is described by way of example with reference to the accompanying drawings, wherein.

DETAILED DESCRIPTION

Figure 1:
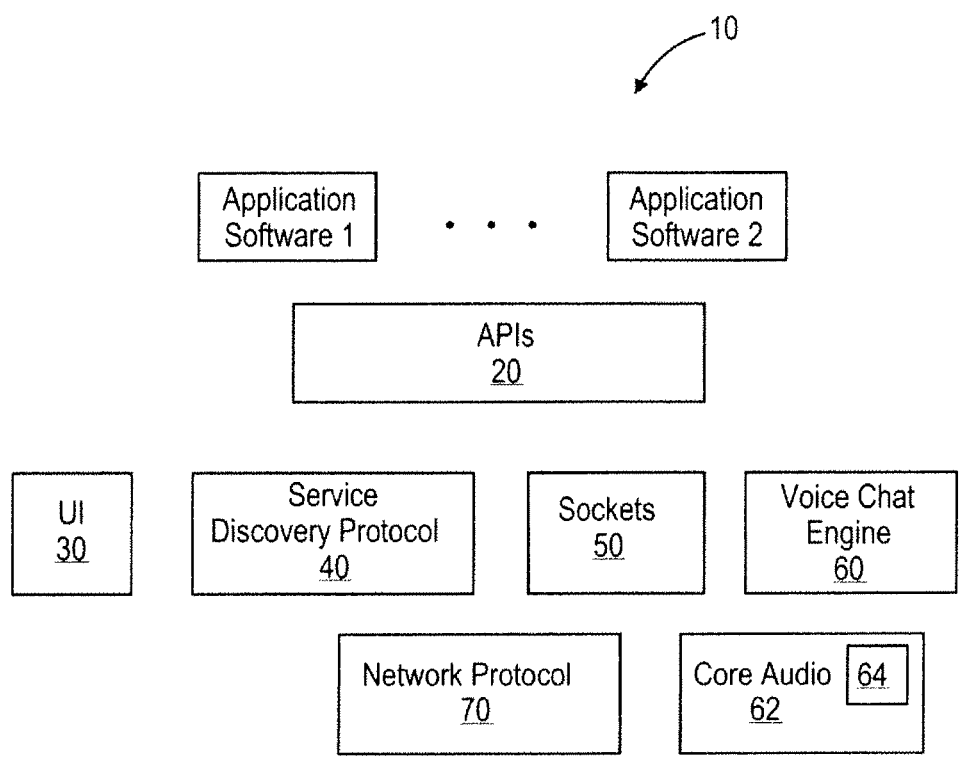
FIG. 1 illustrates a framework for supporting multi-device collaboration in a mobile device in accordance with one embodiment of the present disclosure.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a through understanding of various embodiments of the present disclosure. However, in certain instances, well-known or conventional details are not described in order to provide a concise discussion of embodiments of the present disclosure.

Methods and devices for providing multi-device collaboration are described herein. In one embodiment, a method for providing multi-device collaboration between first and second devices includes transferring an initializing function call to create a session object. The function call specifies a mode of the session object, a service type, and a service name. The session object includes functions to discover the second device, connect with the second device, and provide data transport between the connected first and second devices. The service name includes a truncated name, a unique identification, and a state of service of a collaborative software application associated with the first device. The method includes detecting a network and advertising the service type and the service name via the network. The service type and service name are advertised prior to establishing the connection between the first and second devices.

In one embodiment, the session object provides features such that a user can detect a network connection (e.g., Bluetooth, WiFi, cellular), browse for other devices in this network to obtain a list of services, determine the collaborative services (e.g., music creation, document creation, gaming applications) on the other devices and the state of service (e.g., busy or available) for each of those collaborative services before connecting to those devices in contrast to prior approaches. This can make finding collaborative applications on another device much easier than a prior system which requires a connection first before collaborative applications can be identified.

At least certain embodiments of the present disclosure include one or application programming interfaces in an environment with collaborative kit software interacting with a software application. The collaborative kit software may support a gaming environment which is just one exemplary environment and other environments may use one or more embodiments of the invention; other environments can include collaborative document creation or collaborative music creation, etc. Various function calls or messages are transferred via the application programming interfaces between the collaborative kit software and one or more software applications using the collaborative kit software through the application programming interfaces (APIs). Transferring the function calls or messages may include issuing, initiating, invoking, receiving or responding to the function calls or messages. Application programming interfaces can be used to transfer function calls to implement collaboration (e.g., gaming, document creation, music creation, etc.) networking, service discovery, and voice chat operations for a device having a display region. An API may also implement functions having parameters, variables, or pointers. An API may receive parameters as disclosed or other combinations of parameters. In addition to the APIs disclosed, other APIs individually or in combination can perform similar functionality as the disclosed APIs.

The display region is a form of a window. A window is a display region which may not have a border and may be the entire display region or area of a display. In some embodiments, a display region may have at least one window and/or at least one view (e.g., web, text, or image content). A window may have at least one view. The methods, systems, and apparatuses disclosed can be implemented with display regions, windows, and/or views.

At least certain embodiments of the disclosure may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). In some embodiments, the display device and input device are integrated while in other embodiments the display device and input device are separate devices.

Embodiments of the disclosure described herein may be implemented using other types of data processing systems, such as, for example, entertainment systems or personal digital assistants (PDAs), or general purpose computer systems, or special purpose computer systems, or an embedded device within another device, or cellular telephones which do not include media players, or multi touch tablet devices, or other multi touch devices, or devices which combine aspects or functions of these devices (e.g., a media player, such as an iPod® portable media player, combined with a PDA, an entertainment system, and a cellular telephone in one device, an iPhone®). Because these devices generally have multiple functionalities, these devices may also be referred to as multifunctional devices hereinafter. In this disclosure, electronic devices and consumer devices are types of devices.

In some embodiments, a platform provides various gaming, voice chat, service discovery, and networking operations. The platform includes hardware components and an operating system. The hardware components may include a processing unit coupled to an input panel and a memory coupled to the processor. The operating system includes one or more programs that are stored in the memory and configured to be executed by the processing unit. One or more programs include various instructions for transferring function calls or messages through an application programming interface in order to perform various gaming, voice chat, service discovery, and networking operations.

In some embodiments, the platform includes a framework containing a library of software code. The framework interacts with the programs of the platform to provide application programming interfaces (APIs) for performing various gaming, voice chat, service discovery, and networking operations. The framework also includes associated resources (e.g., images, text, etc.) that are stored in a single directory.

An API is a source code interface that a computer system or program library provides in order to support requests for services from a software application. An API is specified in terms of a programming language that can be interpretative or compiled when an application is built, rather than an explicit low level description of how data is laid out in memory. The software that provides the functionality described by an API is said to be an implementation of the API.

In some embodiments, two or more multifunctional devices are connected to a personal area network (PAN). The multifunctional devices discover each other over the PAN as well as the services available on each other. If the multifunctional devices can support a common multi-device capable application, then each of the multifunctional devices may be configured to perform one or more distributed functionalities of the multi-device capable application. A distributed functionality is a functionality of the multi-device capable application that is assigned to one or more different multifunctional devices, which may perform the distributed functionality substantially simultaneously. The distributed functionalities may include input, output, computing, etc. Each multifunctional device collaborates with other multifunctional devices to perform its distributed functionalities. Moreover, some of the multifunctional devices may collaborate with each other to perform the same distributed functionalities. In other words, each multifunctional device takes up a specific role in performing the multi-device capable application, and has a relationship with other multifunctional devices based on its role. Furthermore, such roles and relationships may be dynamically modified in response to addition of multifunctional devices to the PAN, removal of existing multifunctional devices from the PAN, current status of the execution of the application, and/or user inputs.

Service discovery is performed by devices of a network (e.g., personal area network, local area network, wide area network) broadcasting services that they provide. One protocol by which service discovery may be performed is Bonjour available from Apple Inc. Other service discovery protocols can be used as well. U.S. patent application Ser. No. 12/405,130, describes service discovery protocols in more detail.

Service discovery results in indication of services that are available via the personal area network and not necessarily the physical devices that provide the services. For example, a wireless device may utilize DNS formatted data over a Bluetooth connection to determine services that are available from other Bluetooth devices within range. Other combinations of formats and protocols may also provide service discovery in a similar manner.

By broadcasting services that are available and receiving broadcast messages from other devices, the devices of the network can compile a list of services available via the network. Each device of the personal area network can generate its own list of services available from local and remote devices.

In one embodiment, the list can be dynamically updated based on subsequently-received broadcasts. For example, if a device is removed from the network (e.g. the device leaves an area with WiFi wireless coverage), the services provided by that device can be removed from the list. As another example, if a device is added to the network (e.g., a device enters an area with WiFi wireless coverage), the services provided by the new device can be added to the list in response to a broadcast service availability message.

In one embodiment, service discovery information may be transmitted using DNS or mDNS format. That is, portions of the broadcast may be in DNS or mDNS format. As but one example, DNS-formatted fields having information related to services provided by a broadcasting device may be transmitted in Bonjour-formatted packets over a Bluetooth-compliant wireless connection. Other format-protocol combinations can also be used. Thus, service availability information may be available to a receiving device without the receiving device being connected to the device providing the service. This may provide a more efficient and/or more secure environment in which services may be shared between devices as compared to requiring connections for discovery.

The services provided may be a broad range of services including, but not limited to, print services, local area network (LAN) access services, wide area network (WAN) network services, cellular telephone services, data storage services, application services (e.g., media playback, games, collaborative document creation services, recording). Discovery and access to other services may also be supported and/or provided in the same manner.

The list of available services may be presented to a user of the local device. Alternatively, the local device may have been configured for a default action to respond to certain service availability conditions. In one embodiment, a list of available services may be presented to a user of the local device through an interface such as a display. The user may be able to select one of the available collaborative services (e.g., music creation, poker, hockey, other games). In one embodiment, the list of available services may be updated if no services are selected.

FIG. 1 illustrates a framework for supporting multi-device collaboration in a mobile device in accordance with one embodiment of the present disclosure. As noted elsewhere in this disclosure, multiplayer gaming is just one exemplary environment or use of the one or more embodiments of the invention. The framework 10 includes APIs 20 (e.g., game picker API, game connectivity API, voice chat API, and collaborative kit session API) for providing an interface between the framework 10 and software applications (such as software application no. 1 and software application no. 2). For example, game developers can write software code of one or more gaming applications (such as software application no. 1 and software application no. 2) to call these APIs 20. A game connectivity API provides connectivity functionality using a UI (user interface) 30, a service discovery protocol 40 (e.g., Bonjour network services from Apple, Inc. of Cupertino, Calif.), sockets 50, and one or more network protocols 70 (e.g., Bluetooth, WiFi, cellular).

Socket 50 is a software construct that allows two processes to communicate with network addresses and ports. A voice chat API provides voice chat functionality for integrating voice chat into any software application (e.g., gaming application). A voice chat engine 60 is optimized to support both high quality gaming audio and voice chat simultaneously. A core audio block 62 includes an echo suppressor 64. An example of an echo suppressor is described in conjunction with FIG. 6.

Figure 2:
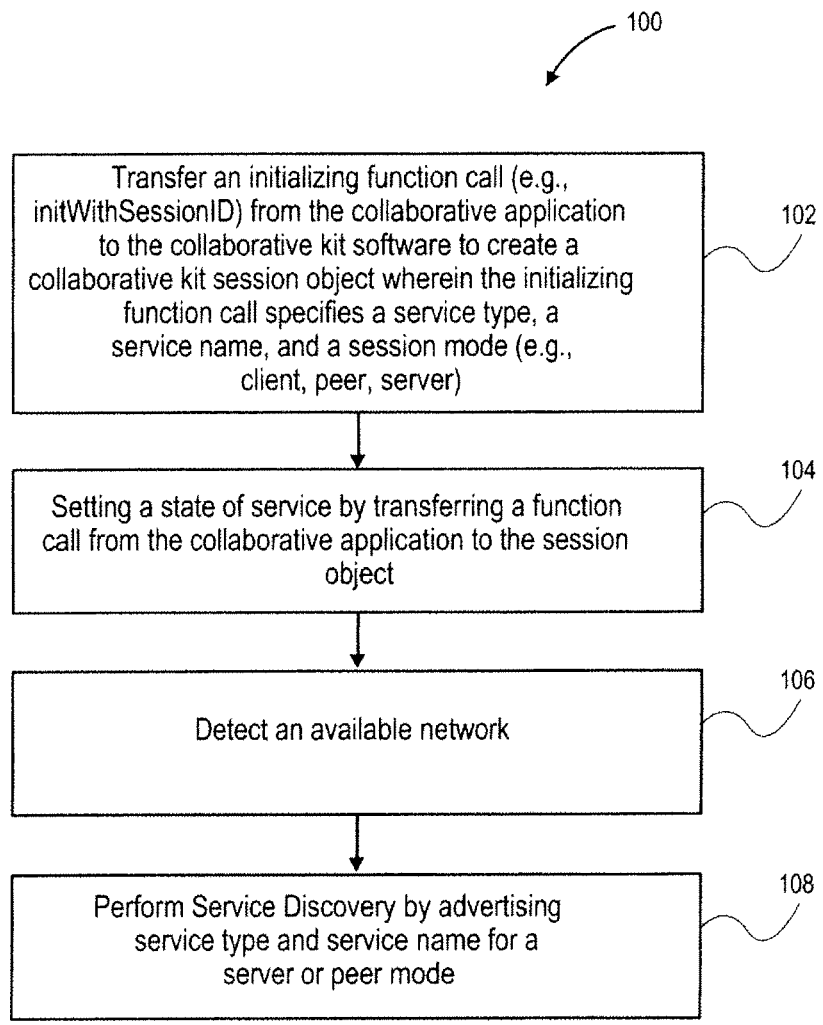
FIG. 2 is a flow chart of a method for supporting multi-device collaboration in a mobile device according to certain teachings of the present disclosure.

FIG. 2 is flow chart of a method for supporting multi-device collaboration in a mobile device according to embodiments of the present disclosure. The application programming interface operates in an environment with a framework in which software (e.g., collaborative kit software which can provide the one or more APIs) interacts with one or more collaborative software applications (e.g., gaming, music). In an embodiment, collaborative kit software provides support for collaborative applications. The method 100 for providing collaborations includes transferring an initializing function call (e.g., initWithSessionID in Appendix A) from the gaming application to the collaborative kit software to create a collaborative kit session object, which manages connections between a network of peers. The collaborative kit session object includes functions to discover available peers, connect with these available peers, and provide data transport between the connected peers. The function call specifies a service type (e.g., sessionID), a service name, and a session mode at block 102. Examples of service type (e.g., sessionID) may include chess, poker, other games, music creation, etc. In an embodiment, all instances of the application need to have the same session ID in order to be able to join a collaboration. The service name having a predetermined number of characters (e.g., 63 characters) may include a truncated name (e.g., displayName such as J's chess), a unique ID, which is used to identify specific instances of the application, and state of service information (e.g., application is busy, application is available for collaboration). In one embodiment, the session mode may be a server, a client, or a peer mode. More details regarding the different session modes are described below.

Next, the method 100 includes setting a state of service (e.g., busy state, available state) of the collaborative application by transferring a function call (e.g., set available state from the collaborative application to the session object at block 104. The method 100 further includes detecting an available network (e.g., Bluetooth, WiFi, cellular) at block 106. Next, the method 100 further includes performing service discovery by advertising service type (e.g., sessionID) and service name for a particular session mode (e.g., server or a peer mode) that advertises services at block 108. In an embodiment, a list of services associated with a device is advertised. These services (e.g., games) can be advertised by, for example, using the Bonjour network services which allow devices using that service to advertise their abilities to other devices on a network. The list of services may include one or more collaborative applications.

As discussed above, the service name can include a truncated name, a unique identification, and the state of service. The state of service may indicate a busy or available for collaboration. In one embodiment, a busy state indicates that the software application which specified the busy state will not participate in a collaborative application with another device having that same software application; the available state, on the other hand, indicates that the collaborative software application (e.g., poker game) on one device is available to engage in a multiplayer game with another software application (e.g., the poker game) on another device. Optionally a state may include a group ID of a predefined set of players (e.g., group of poker players). The service type (e.g., sessionID) identifies how the collaborative application wants to communicate in terms of one or more protocols. If a service type is used by a collaborative developer then it may be hashed to reduce its file size.

In an embodiment, service information is included in a text record having property information. For example, a text record may include a name (e.g., poker) and subfield of the name (e.g., Aces high poker). The text record can be advertised such that a user can browse for services and determine that 10 people are playing poker and 5 of these are playing Aces high poker. The user can then connect to the Aces high poker game if so desired using a group ID of the Aces high poker game and/or by contacting an individual playing in the Aces high poker game.

In one embodiment, the present invention provides the ability for the user to form a network connection (e.g., Bluetooth, WiFi, cellular), browse for other devices in this network, determine the games (or other services) on the other devices and the state of service (e.g., busy or available) for each of those games (or other services) before connecting to those devices in contrast to prior approaches. This can make finding another available game on another device much easier than a prior system which requires a connection first before available games can be identified.

In one embodiment, the session mode may be a server, a client, or a peer mode. The mobile device in server mode advertises its domain name, service type, and service name to other devices. The mobile device in client mode browses or searches for other devices and associated discovery information such as domain name, service type, and service name of these other devices. The mobile device in peer mode advertises its domain name, service type, and service name to other devices. The mobile device in peer mode also browses or searches for other devices and associated discovery information such as domain name, service type, and service name of these other devices. In peer mode, the advertising and browsing may occur at different times in a cyclical manner. For example, during advertising a device may be unable to respond to a connection request from another device. During browsing, a device may be unable to advertise services at the same time. Alternatively, a device may be able to browse and advertise at the same time. In certain embodiments of the present disclosure, transferring the one or more calls is any one of issuing, initiating, invoking or receiving the one or more calls.

The above operations of FIG. 2 can detect a network and perform service discovery by discovering or advertising services between devices prior to wireless connections being formed between the devices. The wireless connections may be part of various types of networks (e.g., Bluetooth, WiFi, cellular).

Figure 3:
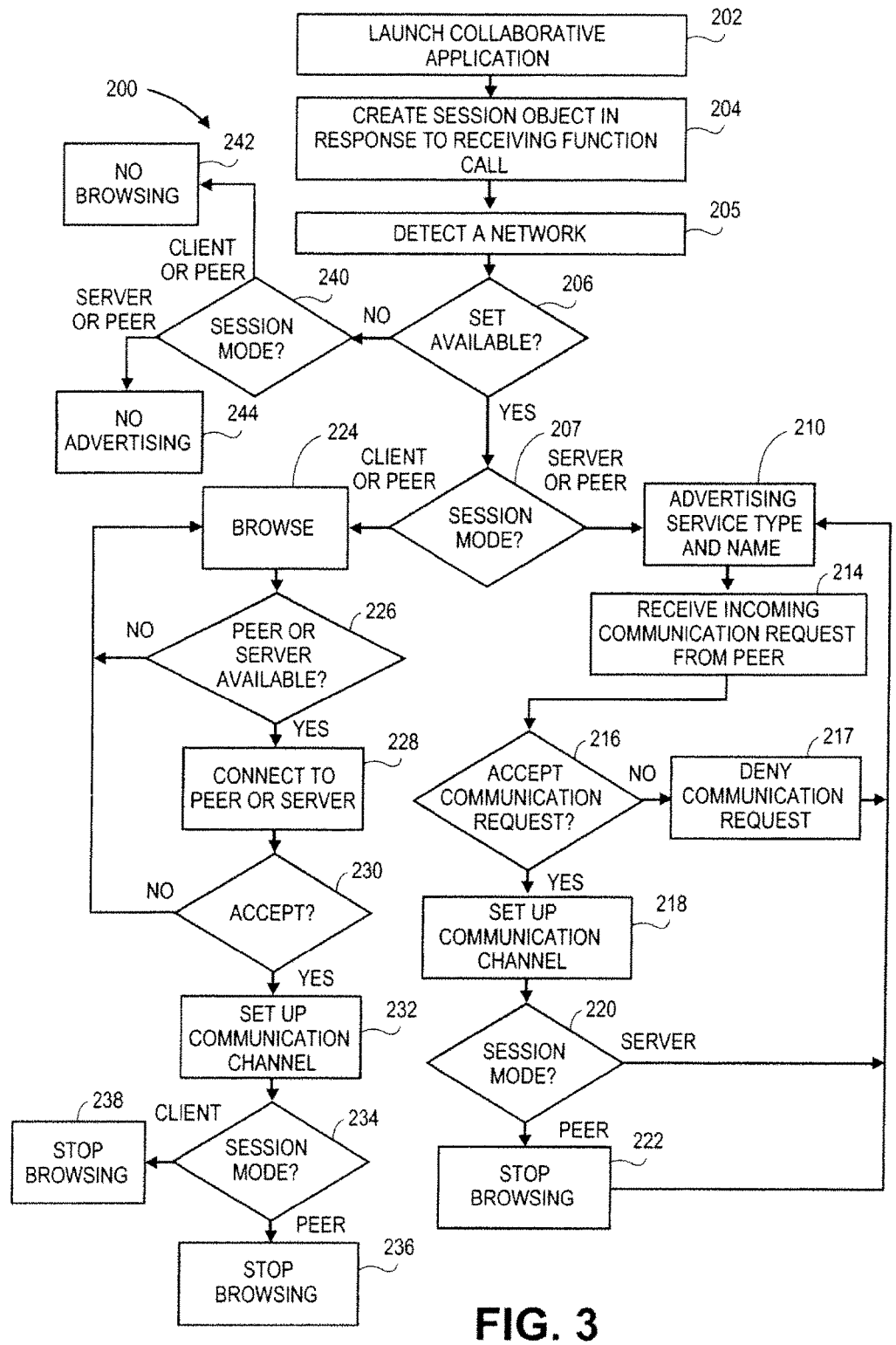
FIG. 3 is a flow chart of a method for supporting multi-device collaboration in a mobile device in accordance with one embodiment of the present disclosure.

FIG. 3 is flow chart of a method for supporting multi-device collaboration in a mobile device in accordance with one embodiment of the present disclosure. The method 200 includes receiving a user input to launch a collaborative application at block 202. The user input may be in the form of an input key, button, wheel, touch (e.g., a touch on a multi-touch input panel attached to a display device), or other means for interacting with the device. The method 200 further includes creating a collaborative kit session object in response to receiving an initializing function call (e.g., initWithSessionID in Appendix A) from the collaborative application through an API to collaborative kit software at block 204. The function call can specify a service type (e.g., sessionID), a service name (e.g., truncated name, unique ID, and state of service), and a session mode (e.g., client, server, or peer).

Next, the method 200 includes detecting an available network (e.g., Bluetooth, WiFi, cellular) at block 205. The method 200 further includes transferring a set available call (e.g., setAvailable in Appendix A) from the collaborative application to the collaborative kit session object at block 206. The set available call sets the available state (e.g., busy, available for service) of the collaborative application. If the collaborative application sets the set available state parameter to YES on the collaborative kit session object, then the collaborative application has an available state of service for collaboration and the method 200 further includes determining a session mode at block 207. The session mode can be determined based on the function call that specifies the session mode. If the session mode is server or peer, then the method 200 further includes performing service discovery by advertising service type (e.g., sessionID) and service name (e.g., truncated name, unique ID, state of service) at block 210. In an embodiment, a list of services associated with a device is advertised. The list of services may include one or more collaborative applications (or other applications such as collaborative document creation, etc.)

The method 200 further includes transferring a function call (e.g., session did receive connection request) from the session object to the collaborative application to indicate receiving an incoming connection request from another device at block 214. The method 200 further includes determining whether the incoming connection request is accepted at decision block 216. For example, a user of the device may determine whether incoming connection request from another device is accepted. The method 200 further includes setting up a communication channel (e.g., wireless connection) between the devices at block 218 if the incoming connection request is accepted at decision block 216. A function call is transferred from the session object to the collaborative application to indicate the acceptance of the connection request. Next, the method includes determining a session mode at block 220. If a server mode is determined, then the method 200 returns to the advertising operation of block 210.

In one embodiment, if a peer mode is determined, then the method 200 optionally stops browsing (e.g., block 224) at block 222 and returns to the advertising operation of block 210. For example, a Bluetooth connection between two peers may not conveniently allow browsing due to network constraints in addition to the collaborative connection established at block 218 between the peers. In another embodiment, a WiFi connection between two peers does conveniently allow browsing in addition to the collaborative connection between the peers.

If the incoming connection request is not accepted at block 216, then the method includes denying the connection request at block 217. For example, a user selection may deny the incoming connection request or the busy state of the collaborative application may automatically deny this request. Then the method 200 returns to the advertising operation of block 210.

In one embodiment, the acceptance of a connection request has a higher priority than a busy or unavailable state. For example, a peer may have a busy or unavailable state. However, if the peer accepts a connection request from the mobile device, then a connection will be established even though the collaborative application of the peer has a busy state.

Returning to block 207, if the session mode is determined to be client or peer, then the method 200 further includes browsing for peer services of this collaborative application at block 224. The method 200 further includes determining whether a peer or server is available at decision block 226. The method 200 further includes connecting with the available peer or server at block 228 if one is available. The session object transfers a function call (e.g., session peer/server did change state) to the collaborative application that indicates if a peer or server is available at block 226. If no peer or server is available at decision block 226, then the method 200 returns to the browsing operation of block 224.

The method 200 further includes transferring a function call (e.g., connect to peer/server with timeout) from the session object to the collaborative application to indicate connecting to the peer or server from the device within a predetermined time period at block 228. The method 200 further includes determining whether the connection request is accepted within the predetermined time period at decision block 230. The method 200 further includes setting up a communication channel (e.g., wireless connection) between the devices at block 232 if the incoming connection request is accepted at decision block 230. A function call is transferred from the session object to the collaborative application to indicate the acceptance of the connection request. Next, the method includes determining a session mode at block 234. If a client mode is determined, then the method 200 optionally stops browsing and the peers collaborate with the collaborative application at block 238.

In one embodiment, if a peer mode is determined at block 234, then the method 200 optionally stops browsing (e.g., block 224) at block 236 and the peers collaborate with the collaborative application. For example, a Bluetooth connection between two peers may not conveniently allow browsing due to network constraints in addition to the collaborative connection between the peers. In another embodiment, a WiFi connection between two peers does conveniently allow browsing in addition to the collaborative connection between the peers.

In an embodiment, for the peer mode, browsing at block 224 and advertising at block 210 may occur concurrently. A first peer can browse for a second peer and set up a communication channel between the peer devices at block 232. Concurrently, the first peer can advertise services and receive an incoming request from a third peer at block 214. A communication channel between the first and third peer devices may be set up at block 218.

Returning to block 206, if the collaborative application sets the set available parameter to NO, then the collaborative application has an unavailable or busy state. The method 200 further includes determining the session mode at decision block 240. Next, the method 200 further includes no advertising of the service type and service name at block 244 if server or peer mode is determined. The method 200 further includes no browsing at block 242 if client or peer mode is determined.

In some embodiments, a collaborative kit session object (e.g., game kit session object) includes a service discovery protocol 40 to discover collaborative services (e.g., gaming services) and sockets 50 to establish network connections. The sockets 50 may obtain network addresses of devices and ports of software applications. Network address translation (NAT) techniques or peer relaying may be implemented to form the connections between devices. One or more network protocols 70 (e.g., Bluetooth, WiFi, cellular) provide a data transport mechanism between devices. In one embodiment, the data transport includes two modes: reliable and unreliable. The reliable mode is used for critical information such as a gaming player reaching a new playing level or a gaming player dying. The unreliable mode is used for non-critical information such as a gaming player's current position.

Figure 4:
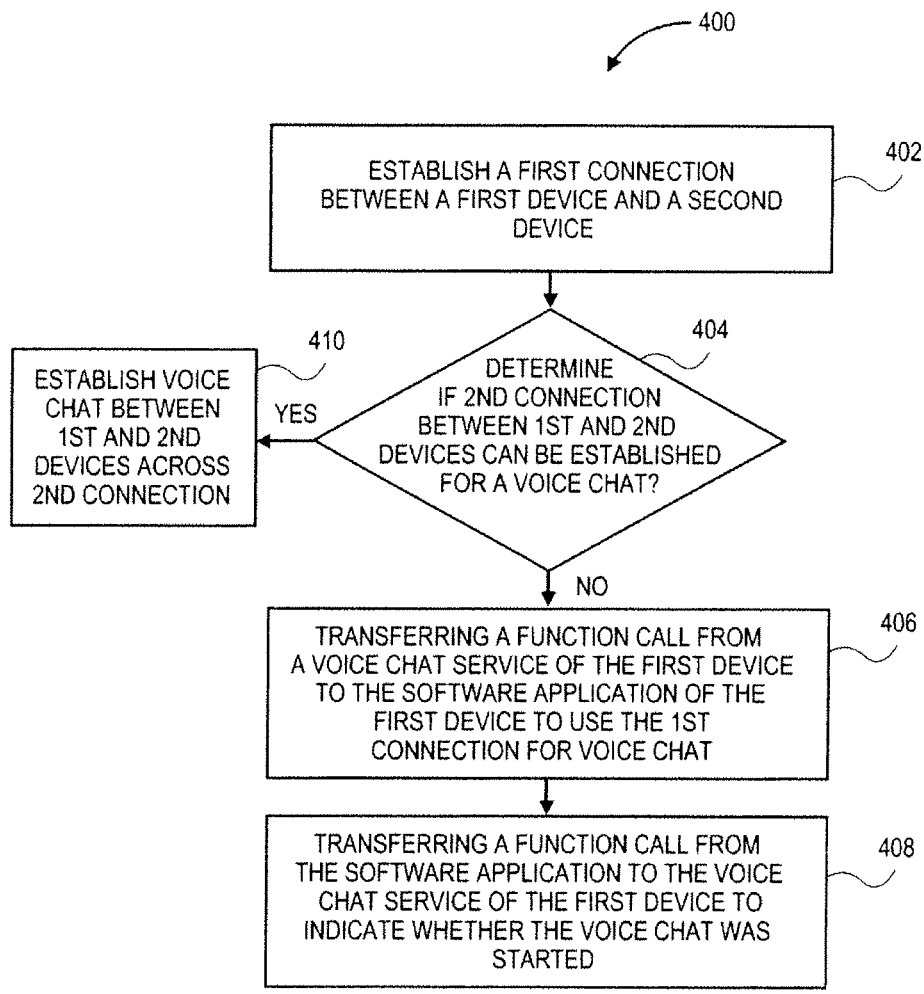
FIG. 4 is a flow chart of a method for operating through an application programming interface (API) to establish a voice chat in one embodiment of the present disclosure.

FIG. 4 is flow chart of a method for operating through an application programming interface (API) to establish a voice chat in one embodiment of the present disclosure. The method operates in an environment having a framework with collaborative kit software interacting with one or more software applications (e.g., collaborative applications, gaming applications) on a first device and also collaborative kit software interacting with one or more software applications on a second device. The method 400 includes establishing a first network connection, either direct (e.g., peer-to-peer) or indirect (e.g., via a server, router, or gateway), between the first device and the second device associated with a software application at block 402. In an embodiment, the collaborative kit software provides support for multi-device collaboration between the first and second devices. The method 400 further includes determining whether a second connection between the first device and the second device can be established to provide a voice chat service between the first and second devices at block 404. The voice chat service may be part of the collaborative kit software. The method 400 further includes transferring a function call (e.g., sendRealTimeData in Appendix A) from a voice chat service of the first device to the software application of the first device to use the first connection for the voice chat at block 406 if the second connection fails. The method 400 further includes transferring a function call (e.g., didStartwithParticipantID, didNotStartwithParticipantID in Appendix A) at block 408 from the software application to the voice chat service to indicate whether the voice chat was started.

The method 400 further includes establishing the voice chat between the first and second devices across the second connection if the second connection is successfully established at block 410. In one embodiment, a collaborative application transferring data and audio packets across the first connection can occur simultaneously with a voice chat service across the second connection. The voice chat may be routed over a WiFi connection to avoid obstructing a Bluetooth collaborative connection. Alternatively, the collaborative first connection and the voice chat second connection may occur across the same network.

Figure 5:
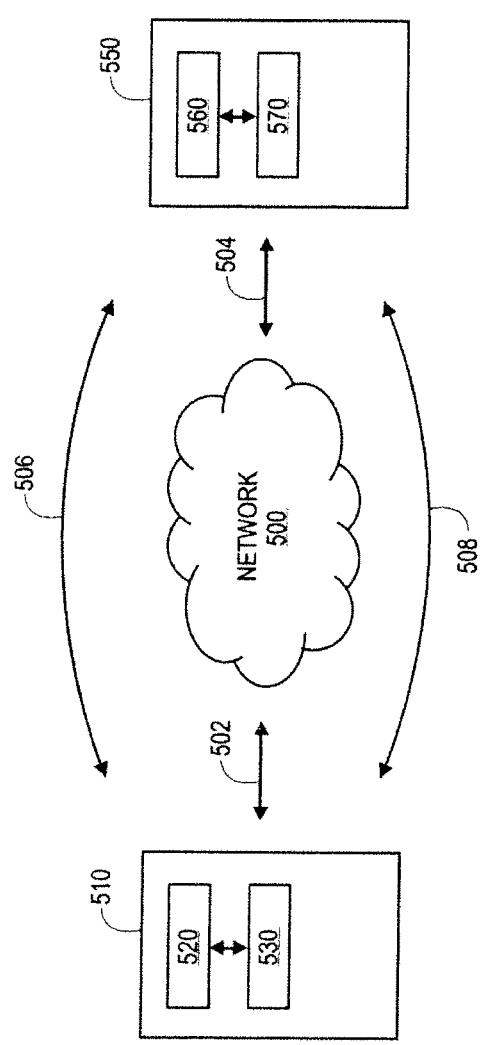
FIG. 5 illustrates a network diagram for implementing a collaborative application and a voice chat in accordance with one embodiment of the present disclosure.

FIG. 5 illustrates a network diagram for providing multi-device collaboration (e.g., music creation, document creation, gaming application, etc.) and a voice chat in accordance with one embodiment of the present disclosure. A network 500 connects devices 510 and 550 via links 502 and 504 or a peer-to-peer connection 506 connects the devices.

In one embodiment, the peer-to-peer connection 506 connects the first and second devices. Users of these devices are collaborating with a collaborative application 520, 560 (e.g., document creation, music creation, hockey, poker, etc). Collaborative kit software 530 and 570 having a collaborative kit API are used to establish the connection 506 between the devices, respectively. The collaborative kit API can select between different types of connections (e.g., Bluetooth, WiFi, cellular). The collaborative kit API can aggregate a large number of packets into a smaller number of large packets. Conversely, the collaborative kit API can fragment a large packet into a number of smaller packets depending on the requirements of a network protocol connection. A collaborative application transferring data and audio packets can occur simultaneously with a voice chat connection. The voice chat may be routed over a WiFi connection to avoid obstructing a Bluetooth connection. Alternatively, the collaborative connection and the voice chat connection may occur across the same network.

In one embodiment, user A of device 510 wants to establish a voice chat with the user B of the device 550 concurrently with the collaboration between users A and B (e.g., game being played by users A and B). A voice chat service that is part of the collaborative kit software 530 accesses the connection 506 to send a voice chat invite to the software application 560 (e.g., game application), which passes this invite to a voice chat service of the collaborative kit software 570 of user B. The voice chat service of B informs the software application 560 that it has received the invite. Next, voice chat service of B accepts the invite. The voice chat services of A and B exchange identification information (e.g., participantID) and connection data (e.g., network addresses and ports) for communicating using a voice chat protocol. Next, a peer-to-peer connection 508 is established between voice chat services of users A and B.

In some embodiments, the peer-to-peer connection 508 cannot be established between voice chat services of users A and B. In this case, voice chat service A sends a function call (e.g., sendRealTimeData to ParticipantID_B in Appendix A) to software application 520 (e.g., game application) or voice chat service B sends a function call (e.g., sendRealTimeData to ParticipantID_A) to software application 560. The function call indicates a request to use the connection 506 for establishing a voice chat between users A and B because the connection 508 failed.

In an embodiment, an indirect connection from user A to user B is formed for playing the gaming application. The network 500 having one or more servers and/or routers connects the devices using links 502 and 504. A voice chat can be established across connection 508 in the manner described above, except that the voice messages are sent using the indirect connection. If the peer-to-peer connection 508 can not be established between voice chat services of users A and B, then voice chat service A sends a function call to game application 530 or voice chat service B sends a function call to game application 560. The function call indicates a request to use the indirect connection for establishing a voice chat between users A and B because the connection 508 failed.

In certain embodiments, user A and B establish a connection for playing a gaming application. User A or user B can connect with a different user (e.g., user C, user D) and establish a voice chat with this user.

Figure 6:
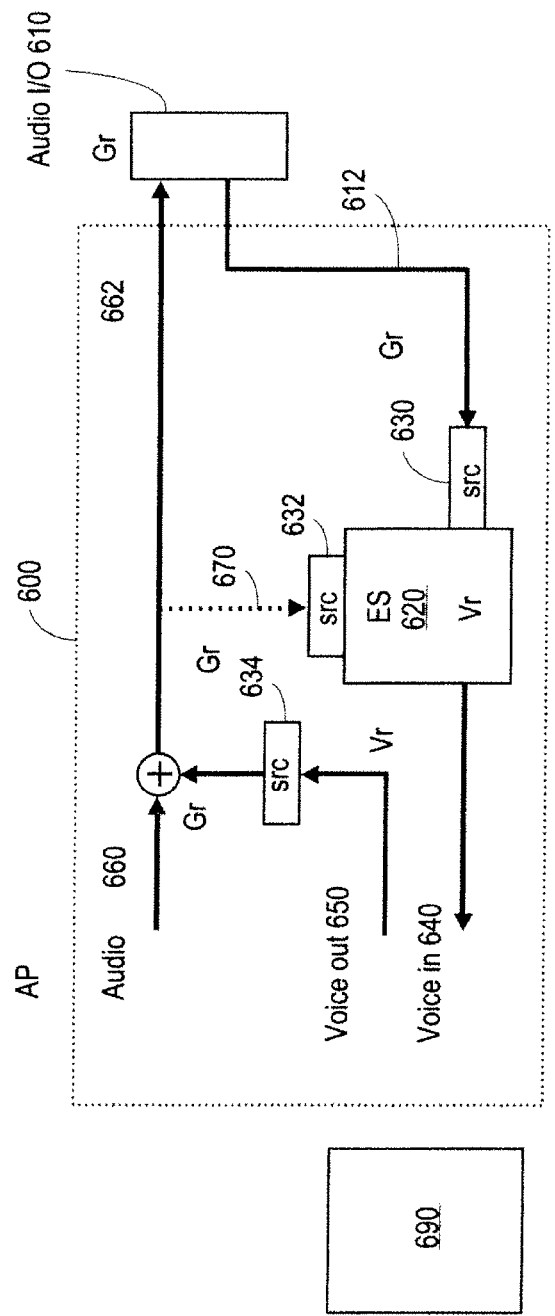
FIG. 6 illustrates a processing system having an echo suppressor in accordance with one embodiment of the present disclosure.

FIG. 6 illustrates a processing system having an echo suppressor in accordance with one embodiment of the present disclosure. The processing system 600 is associated with a collaborative application (e.g., music creation, gaming application) and includes an audio signal 660 having a sampling rate, Gr, an audio input/output unit 610 (e.g., speaker output, microphone input), a voice input signal 640, and a voice output signal 650. The processing system 600 further includes an echo suppressor 620 and sampling rate converters 630, 632, and 634.

The processing system 600 is designed to generate a high quality audio signal at a high sampling rate (e.g., 44 KHz) for the local collaborative application associated with a device. The processing system 600 can also provide echo suppression for a voice chat occurring simultaneously as the collaborative audio. For example, users A and B can be playing a game together and also voice chatting. Alternatively, users A and B can be playing a game together while user A is voice chatting with user C.

An acoustic echo may occur because of the coupling between the output (e.g., loudspeaker) of a stereo two channel audio signal 662 and input (e.g., microphone) of a single channel voice signal 612 of the I/O unit 610. The ES 620 receives a reference signal 670 that includes the audio signal 660 and the voice out signal 650, which is received from a remote user via network interface 690. The ES 620 also receives a voice input signal 612 from a local user of the device via the I/O unit 610. The voice input signal 612 includes an echo component. The ES 620 uses time domain and frequency domain transforms and processing techniques to cancel the echo component and generates voice input signal 640 having a reduced and/or eliminated echo component. The voice input signal 640 may be sent to the remote user via the network interface 690.

The processing techniques of the ES 620 differ from known processing techniques. The unique implementation of the ES 620 resides in the estimation of a spectral cross correlation function. For known processing techniques, this correlation is calculated for every frequency band. In contrast, the ES 620 calculates the correlation over a psychoacoustically weighted scale. This results in fewer values to compute saving processing resources and allows the suppressor to better accommodate to the perception by the human ear.

In one embodiment, the spectral cross correlation between the frequency domain representation of the reference signal 670 and the frequency domain representation of the voice input signal 612 is computed as the complex-valued dot product of these two signals. Rather than evaluating a single sum over the whole frequency range, the spectral cross correlation is evaluated over non-overlapping frequency bands. The band boundaries coincide with the Bark scale, which represents a psychoacoustical scale of frequencies. The scale ranges from 1 to 24 and corresponds to the first 24 critical bands of hearing. This results in a single complex value for every band representing the cross correlation for that same band. By doing so, the system implicitly accounts for psychoacoustical properties of the human hearing system and at the same time significantly reduces the amount of information to be further processed.

In some embodiments, a first user is playing a multiplayer game with a second user. Each user has a handheld device for playing the game and also voice chatting. The game audio signal 660 may have a sampling rate of Gr (e.g., approximately 44.1 KHz) while the voice output and input signals 650 and 640 have a lower sampling rate of Vr (e.g., approximately 8 KHz). The SRC 634 converts the voice signal with a sampling rate of Vr into a Gr signal that combines with the game audio signal 660. The SRC 632 converts the Or reference signal into an Vr signal received by the ES 620. The SRC 630 converts the Or input signal 612 into a Vr signal received by the ES 620. The ES 620 operating at a lower sampling rate of the voice chat cancels the echo component and generates voice input signal 640 having a reduced and/or minimized echo component and a sampling rate of Vr (e.g., approximately 8 KHZ sampling rate). The ES 620 operates at a lower sampling rate (e.g., 8 KHz) to cancel the echo component while conserving processing resources for generating the high quality game audio at a higher sampling rate (e.g., 44.1 KHz). The game audio and voice signals can be processed at any sampling rate and do not need to be integral divisors.

The sampling rate of the voice signals are determined based on network constraints for voice chat while the sampling rate of the audio signal 660 is determined and optimized based on hardware constraints of the processing system 600 and local device.

In one embodiment, the game audio signal is replaced with any high quality audio signal (e.g., music library audio signal) that is processed at a high sampling rate. In an alternative embodiment, the sampling rate of the voice chat (e.g., 12 KHz, 8 KHz, 11.025 KHz, 8 KHz, 11.025 KHz) is an integral divisor of the sampling rate of the game audio (e.g., 48 KHz, 48 KHz, 44.1 KHz, 32 KHz, 22.05 KHz), respectively.

Figure 7:
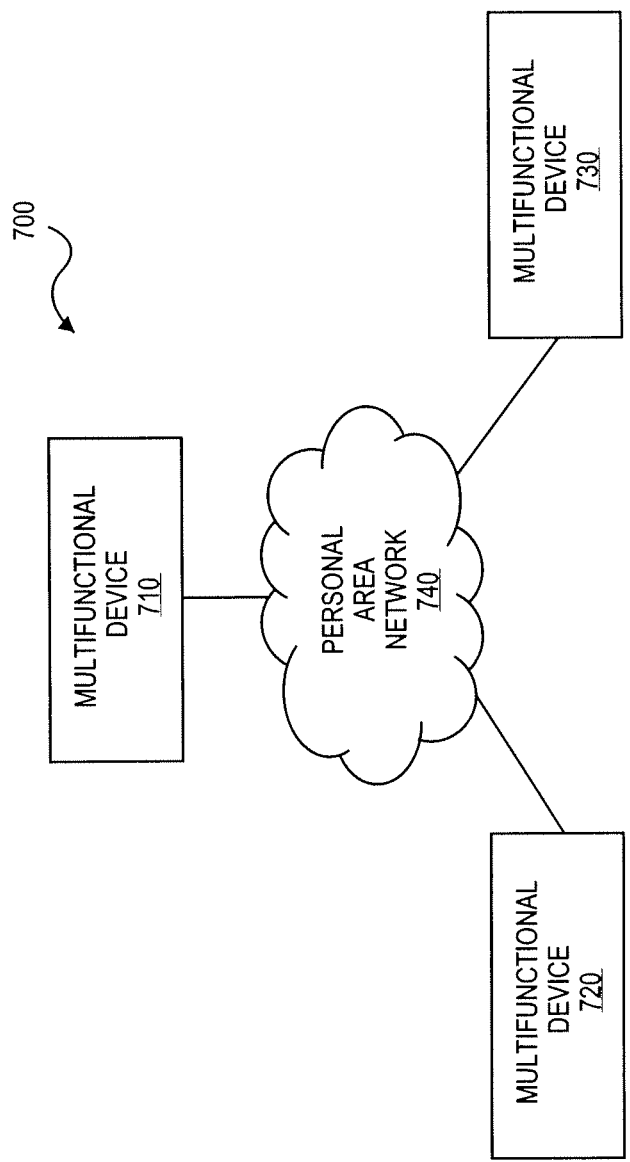
FIG. 7 is one embodiment of a system of multifunctional devices connected to a personal area network.

FIG. 7 is one embodiment of a system of multifunctional devices connected to a personal area network (PAN). System 700 includes multiple multifunctional devices 710-730 coupled to PAN 740. A PAN generally refers to a computer network used for communication between computing devices, such as multifunctional devices 710-730, physically close to one or more users. The connections in the PAN are typically wireless. The reach of a PAN in some embodiments is relatively short-ranged, such as a few meters. Some exemplary protocols for implementing a PAN include Bluetooth, Infrared Data Association (IrDA), ultra-wideband (UWB), etc. Multifunctional devices 710-730 may be the same type of devices or different type of devices, such as media players (e.g., any iPod® device sold by Apple, Inc. of Cupertino, Calif.), cellular telephones (e.g., iPhone® cellular telephones sold by Apple, Inc. of Cupertino, Calif.), etc.

Once coupled to PAN 740, each of multifunctional devices 710-730 may discover other multifunctional devices connected to PAN 740 and services available on the devices discovered. In some embodiments, multifunctional devices 710-730 use the service discovery tool, Bonjour, as discussed in details above. Note that in some embodiments, a multifunctional device may not have to connect to other multifunctional devices connected to PAN 740 in order discover the other multifunctional devices and their services. Rather, service discovery information may be transmitted using DNS or mDNS format in order to allow discovery of a device without connecting to the device. Details of service discovery have been discussed above. If multifunctional devices 710-730 support a common multi-device capable application, such as a multi-device capable gaming application (e.g., game kit), then multifunctional devices 710-730 may configure themselves to perform one or more distributed functionalities of the application. Note that an application as used herein broadly refers to one or more software modules that operate together to perform a set of one or more tasks. A multi-device capable application generally refers to an application that can be executed or run on multiple devices simultaneously, where the multiple devices collaborate with each other in execution of the application. Details of some embodiments of a method to support multi-device collaboration have been discussed above with reference to FIG. 2. To share the application between multifunctional devices 710-730, the software modules running on each of multifunctional devices 710-730 may have been previously installed on the respective multifunctional devices. Alternatively, one of multifunctional devices 710-730 may transmit specific software modules to another one of multifunctional devices 710-730 during configuration. In some embodiments, multifunctional devices 710-730 sharing an application have the same set of software modules running on them. Alternatively, multifunctional devices 710-730 sharing an application have different software modules of the same application running on them, but multifunctional devices 710-730 nevertheless collaborate with each other to perform the task(s) of the application. Or some modules may have some of the same modules, whereas others are different. For example, the same modules may be those that govern or determine global status or aspects of collaboration. Different modules may be individual role each device takes in collaboration.

In some embodiments, the distributed functionalities include input, output, computing, etc. In one embodiment, multifunctional device 710 is configured to be a dedicated input device, while multifunctional devices 720 and 730 are configured to be dedicated output devices. Furthermore, multifunctional devices 720 and 730 may be presenting the same output interface in its entirety, or each presenting a portion of the output interface. For example, multifunctional device 720 may display the left half of the output graphical interface, while multifunctional device 730 may display the right half of the output graphical interface. In another embodiment, multifunctional devices 710 and 720 are configured to be dedicated input devices, while multifunctional device 730 is configured to be a dedicated output device. Multifunctional devices 710 and 720 may be presenting the same input interface in its entirety, or each presenting a portion of the input interface. For example, multifunctional device 720 may display the left half of the input graphical interface, such as a piano keyboard, while multifunctional device 730 may display the right half of the input graphical interface. In an alternate embodiment, each of multifunctional devices 710-730 is configured to perform a particular part of the computing of the multi-device capable application. For example, the application may be a bat and ball gaming application, and multifunctional device 710 may be configured to act as a ball while multifunctional devices 720 and 730 may be configured to act as bats. Thus, multifunctional device 710 is responsible for performing computation related to the movement of the ball while multifunctional devices 720 and 730 are responsible for performing computation related to the movement of their respective bats.

By assigning the distributed functionalities to multifunctional devices 710-730, multifunctional devices 710-730 may be turned into virtual accessories of each other. Note that the above examples are meant to illustrate the concept of using multifunctional devices 710-730 to perform various distributed functionalities of a multi-device capable application. Other ways of assigning the distributed functionalities to multifunctional devices 710-730 are possible in different embodiments. Furthermore, other embodiments may include more or fewer multifunctional devices.

Figure 8:
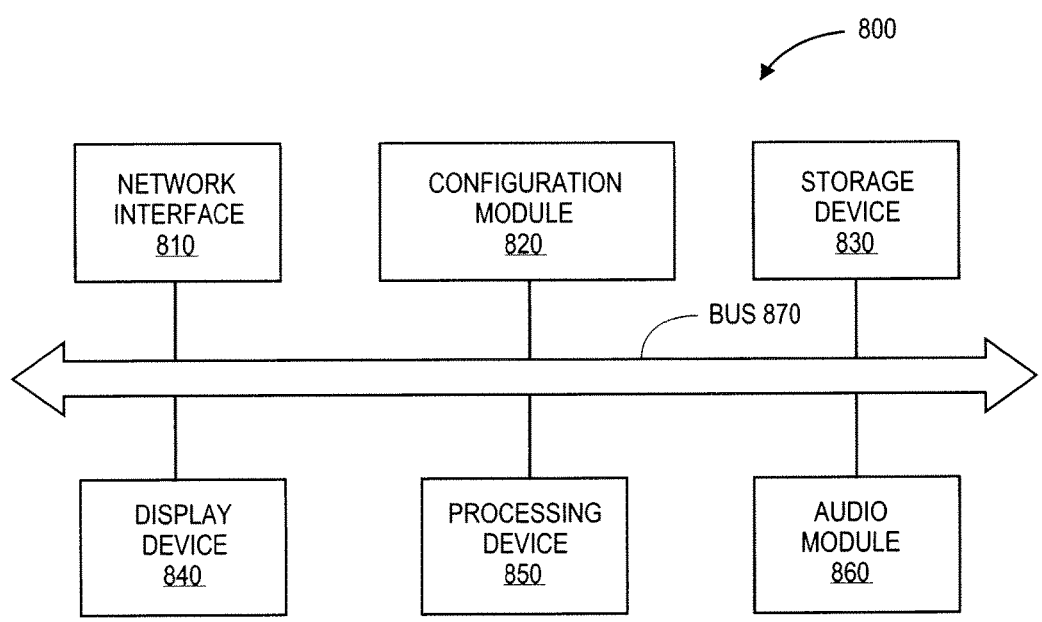
FIG. 8 is one embodiment of a multifunctional device.

FIG. 8 is one embodiment of a multifunctional device usable in the system 700 discussed above. Multifunctional device 800 includes a network interface 810, a configuration module 820, a storage device 830, a display device 840, a processing device 850, and an audio module 860, coupled to each other via a bus 870. Multifunctional device 800 may be implemented using a portable media player, a cellular telephone, a personal digital assistant, etc.

In some embodiments, processing device 850 may retrieve code from storage device 830 to launch a multi-device capable application, such as a gaming application. Network interface 810 establishes a connection to a PAN (such as PAN 740 in FIG. 7). Then processing device 850 may use a discovery service tool, such as Bonjour, to discover other devices coupled to the PAN and services available on these devices. Note that multifunctional device 800 may or may not be connected to the other devices coupled to the PAN in order to discover these devices and their services. As discussed above, multifunctional device 800 may rely on DNS or mDNS formatted broadcast messages to discover the other devices without connecting to the other devices. If it is determined that multifunctional device 800 shares the same multi-device capable application with the other devices, configuration module 820 may configure multifunctional device 800 to perform one or more distributed functionalities of the application in collaboration with the other devices. For instance, configuration module 820 may sign up a role with respect to execution of the application, such as a dedicated input or a dedicated partial input, a dedicated output or a dedicated partial output, etc. Configuration module 820 may sign up the role based on user input or default setup stored in storage device 830. Based on the configuration, processing device 850 may perform the distributed functionalities associated with the role in collaboration with the other devices. For instance, processing device 850 may retrieve instructions of the application from storage device 830 and perform operations in response to the instructions, as well as data from the other devices, such as user inputs to the other devices, status of the execution of the application on the other devices, etc. Details of some embodiments of a method to support multi-device collaboration have been discussed above with reference to FIG. 2.

In some embodiments, display device 840 displays an output interface of the application, or a portion of the output interface of the application based on the configuration. Alternatively, display device 840 may display an input interface of the application, or a portion of the input interface of the application based on the configuration.

In some embodiments, multifunctional device 800 may be configured as an output device, and audio module 860 plays an output audio recording for the application. Note that audio module 860 may play the entire output audio recording for the application, or audio module 860 may play part of the output audio recording while another device connected to the PAN plays another part of the output audio recording, depending on the role of the device plays in the collaboration.

Figure 9:
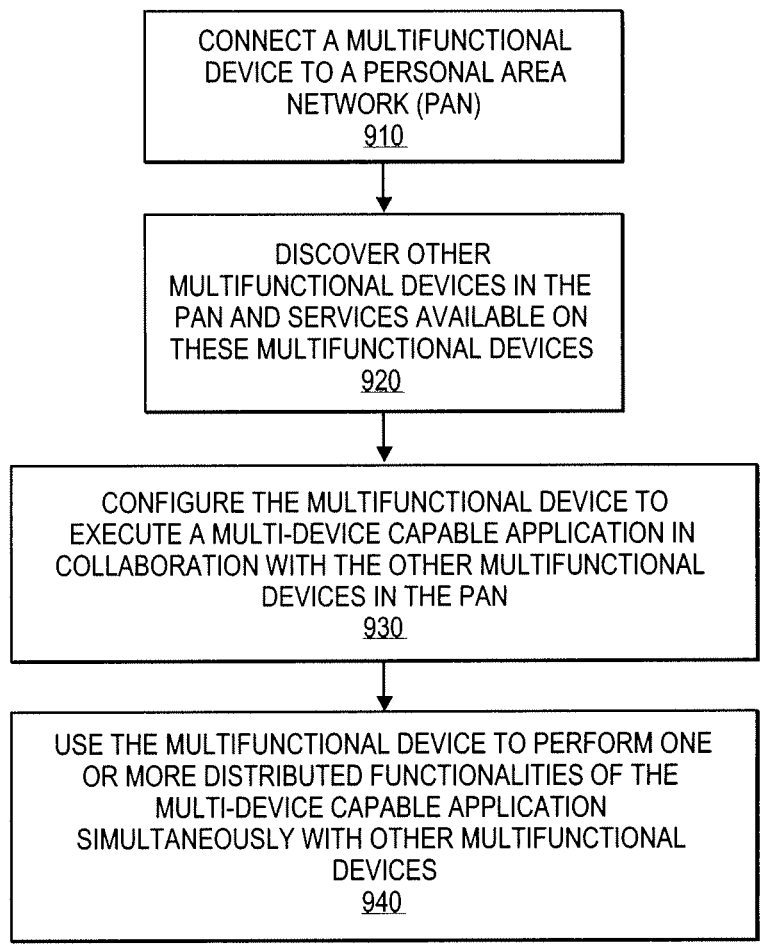
FIG. 9 is a flow chart of a method for providing a multifunctional device as virtual accessory in accordance with one embodiment of the present disclosure.

FIG. 9 is a flow chart of a method for providing a multifunctional device as virtual accessory in accordance with one embodiment of the present disclosure. The method may be performed by hardware, software, firmware, or a combination of any of the above. For example, the method may be performed by processing device 850 and configuration module 820 of the multifunctional device 800 illustrated in FIG. 8.

Initially, a multifunctional device is connected to a PAN, such as PAN 740 in FIG. 7, at block 910. Then other multifunctional devices in the PAN and services available on these devices are discovered at block 920. If the multifunctional device and the other multifunctional devices discovered support a common multi-device capable application, the multifunctional device is then configured to execute the multi-device capable application, such as a gaming application, in collaboration with the other multifunctional devices in the PAN at block 930. In other words, the multifunctional devices may be configured to launch the multi-device capable application if they support the procedures associated with the multi-device capable application for launching and executing the multi-device capable application in collaboration. At block 940, the multifunctional device is used to perform one or more distributed functionalities of the multi-device capable application simultaneously with the other multifunctional devices performing their respective distributed functionalities. By configuring the multifunctional device accordingly, the multifunctional device may be turned into a virtual accessory of one or more of the other multifunctional devices. Alternatively, the multifunctional device may turn the other multifunctional devices into its virtual accessories.

Figure 10:
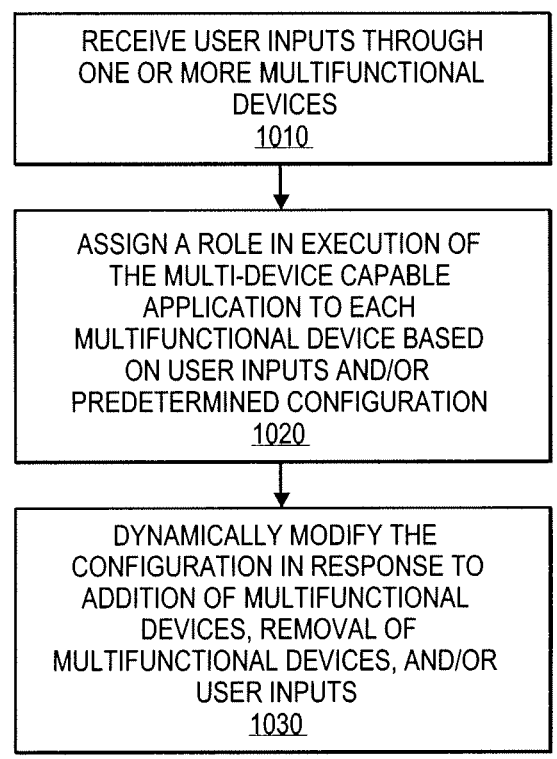
FIG. 10 is a flow chart of a method for configuring a multifunctional device to be a virtual accessory in accordance with one embodiment of the present disclosure.

FIG. 10 is a flow chart of a method for configuring a multifunctional device to be a virtual accessory in accordance with one embodiment of the present disclosure. The method may be performed by hardware, software, firmware, or a combination of any of the above. For example, the method may be performed by configuration module 820 of multifunctional device 800 illustrated in FIG. 8.

At block 1010, user inputs are received through one or more multifunctional devices connected to a PAN, such as multifunctional devices 710-730 in FIG. 7. Based on the user inputs and/or predetermined configuration stored in the multifunctional device, a role in execution of a multi-device capable application is assigned to each multifunctional device at block 1020. For example, one of the multifunctional devices may be assigned a role of a dedicated input device, while another one of the multifunctional device may be assigned a role of a dedicated output device. Furthermore, each multifunctional device may sign up for their respective role. Alternatively, one of the multifunctional devices may act as a master to assign or designate a role to each multifunctional device. At block 1030, the configuration may be dynamically modified in response to addition of multifunctional devices to the PAN, removal of multifunctional devices from the PAN, current state of the execution of the application, and/or new user inputs. For example, when a multifunctional device that has been previously designated as an input device has been removed from the PAN (e.g., a user has terminated the connection between the device and the PAN), another multifunctional device may detect the removal of the device and thus, sign up to be the new input device. In another example, a multifunctional device, acting as a master, may monitor and detect the removal of the multifunctional device, and then designate another multifunctional device to be the new input device. In another example, a multifunctional device, acting as a master, may monitor and detect the addition of another multifunctional device, and hence, re-configure the other devices to split an output user interface among the other devices and the newly added device.

Using the above approach, numerous configurations can be created to execute a multi-device capable application. To further illustrate the above concept, several exemplary multi-device capable applications are discussed in details below. However, one should appreciate that the following examples are for illustrative purpose only, not limiting the concept disclosed herein.

Figure 11:
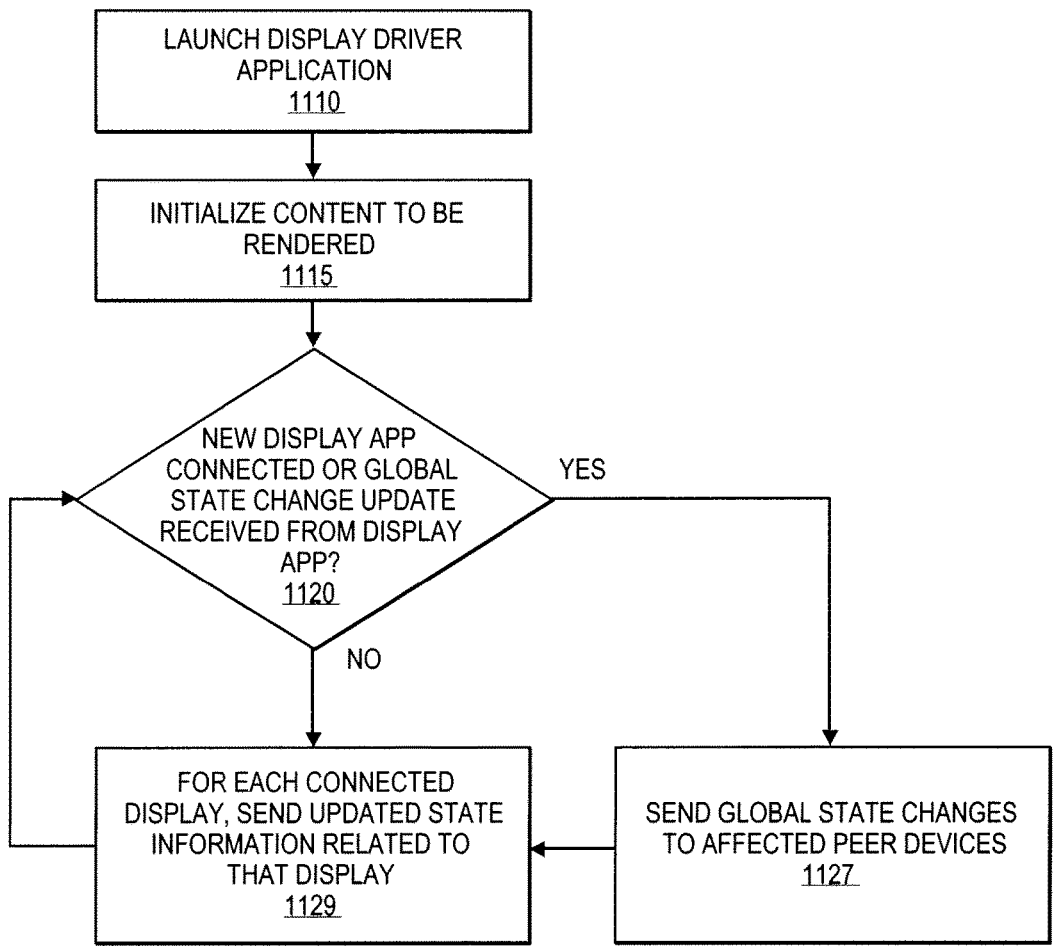
FIG. 11 is a flow chart of a method for providing a centralized distributed output driver in accordance with one embodiment of the present disclosure.

FIG. 11 is a flow chart of a method for providing a centralized distributed output driver application in accordance with one embodiment of the present disclosure. The method may be performed by hardware, software, firmware, or a combination of any of the above. For example, the method may be performed by processing device 850 of multifunctional device 800 illustrated in FIG. 8. Furthermore, the multifunctional device may be a multifunctional device connected to a PAN to run a distributed output driver, where the output functionality is distributed between the multifunctional device and one or more peer devices connected to the PAN. For instance, an output GUI is displayed on multiple multifunctional devices connected to the PAN, or the output GUI is divided into multiple parts, each being displayed on one of the multifunctional devices connected to the PAN. The distributed output driver running on the multifunctional device controls the display applications running on the other multifunctional device.

At block 1110, a display driver application is launched on a multifunctional device connected to a PAN. The content to be rendered is initialized at block 1115. Then it is checked if any new display applications running on other multifunctional devices have been connected to the same PAN or if any global state change update has been received from the display application running on the peer devices at block 1120. If there is, then the global state changes are sent to affected peer multifunctional devices on the PAN at block 1127. For each connected display, updated state information related to that display application is then sent at block 1129. Otherwise, if there is no new display application connected and there is no global state change update received, then updated state information related to that display application is sent at block 1129. Then the method transitions back to block 1120 to repeat the above operations.

Figure 12:
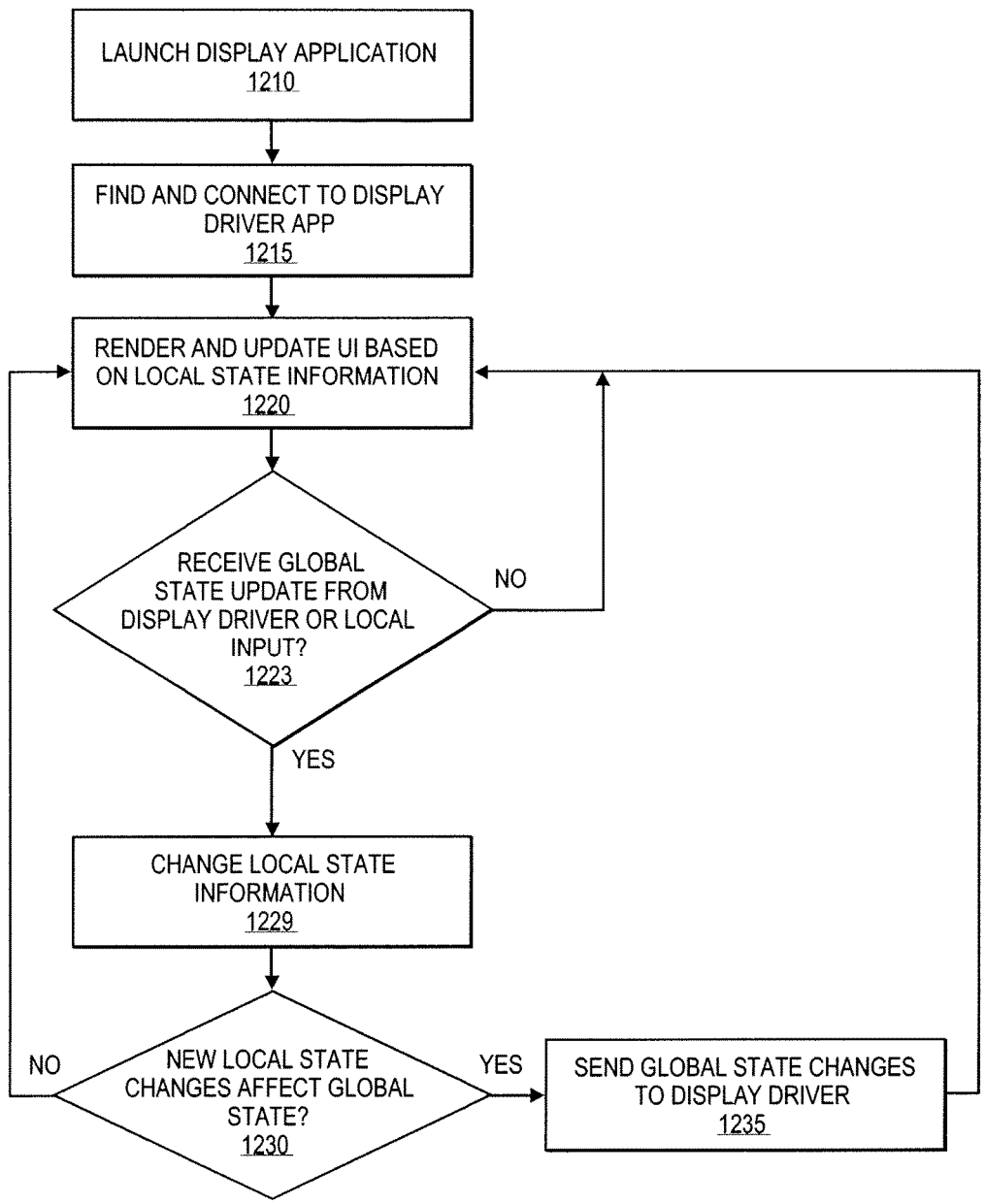
FIG. 12 is a flow chart of a method for providing a centralized distributed output display application in accordance with one embodiment of the present disclosure.

FIG. 12 is a flow chart of a method for providing a centralized distributed output display application in accordance with one embodiment of the present disclosure. The method may be performed by hardware, software, firmware, or a combination of any of the above. For example, the method may be performed by processing device 850 of multifunctional device 800 illustrated in FIG. 8. Furthermore, the multifunctional device may be a multifunctional device connected to a PAN, where the output functionality is distributed between the multifunctional device and one or more peer devices connected to the PAN. For instance, each multifunctional device may run a distributed output display application to display all or part of an output GUI, while one of the multifunctional devices runs a display driver to coordinate the display applications running on the multifunctional devices, such as the display driver described above with reference to FIG. 11.

At block 1210, a display application is launched on a multifunctional device. Then the multifunctional device finds and connects to display driver application running on another multifunctional device over a PAN at block 1215. A user interface is rendered and updated based on local state information at block 1220.

At block 1223, it is checked if any global state update has been received from the display driver (such as the display driver discussed with reference to FIG. 11), or if any local input has been received. Note that the display driver may run locally or on one of the peer devices. If there is no global state update and no local input, then the method transitions back to block 1220 to render and update the user interface based on local state information. Otherwise, if either global state update is received from the display driver or local input has been received at block 1223, then the local state information is changed at block 1229.

From block 1229, the method transitions into block 1230 to check if any new local state changes affect the global state. If there is, then the global state changes are sent to the display driver, which may be running locally or on one of the peer devices, at block 1235, and the method transitions back to block 1220 to render and update the user interface based on local and/or global state information. Otherwise, if the new local state changes do not affect the global state at block 1230, then the method transitions directly back to block 1220 to render and update the user interface based on local state information.

Figure 13:
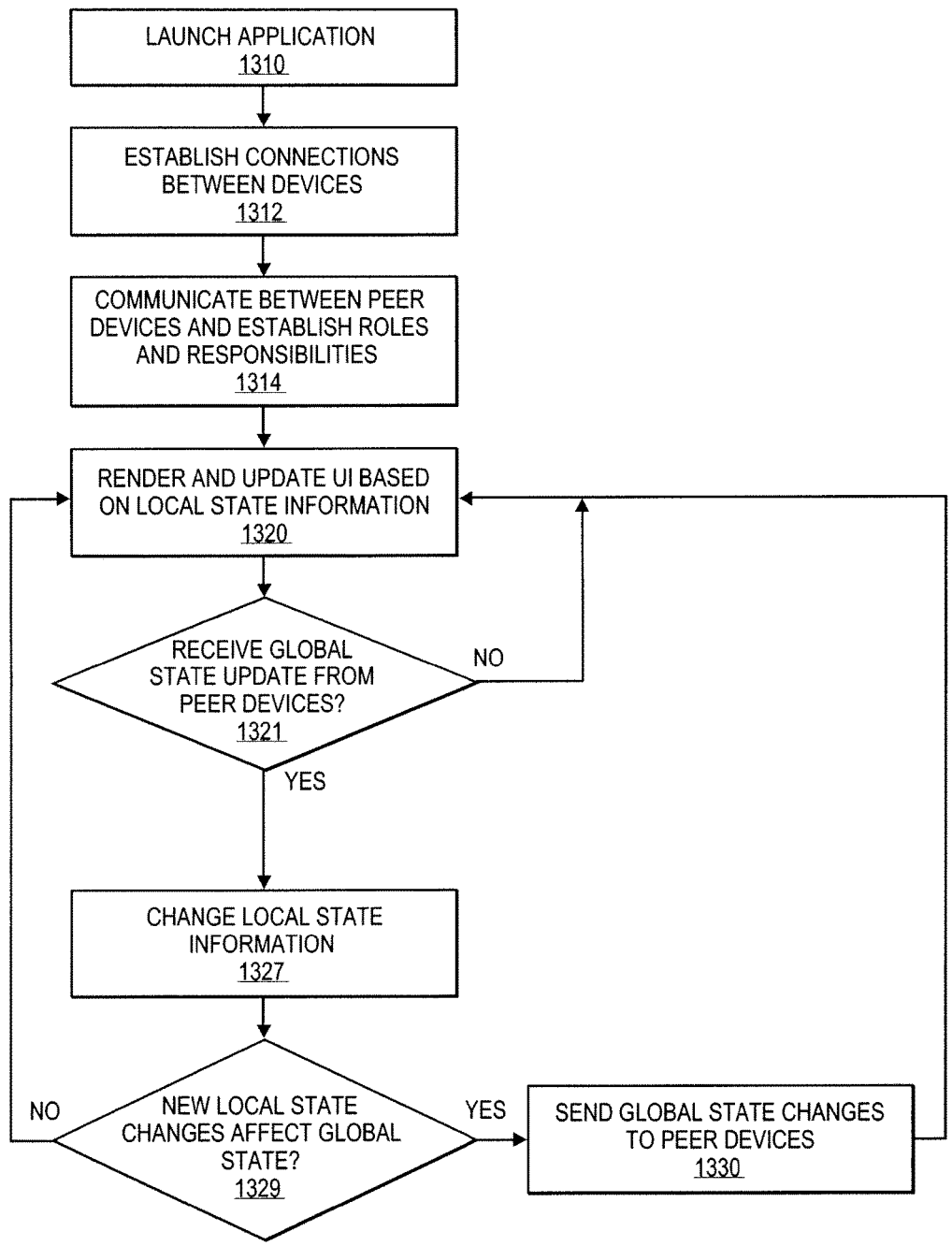
FIG. 13 is a flow chart of a method for providing a decentralized distributed output functionality in accordance with one embodiment of the present disclosure.

FIG. 13 is a flow chart of a method for providing a decentralized distributed output functionality in accordance with one embodiment of the present disclosure. The method may be performed by hardware, software, firmware, or a combination of any of the above. For example, the method may be performed by the processing device 850 of the multifunctional device 800 illustrated in FIG. 8. Furthermore, the multifunctional device may be a multifunctional device connected to a PAN, where the output functionality is distributed between the multifunctional device and one or more peer devices connected to the PAN. For instance, each multifunctional device may run a distributed output application to display all or part of an output GUI. Unlike the methods described with reference to FIGS. 11 and 12, there is no distributed output driver running on the multifunctional devices according to the method illustrated in FIG. 13.

At block 1310, a multi-device capable application is launched. Then connections between multifunctional devices are established over a PAN at block 1312. At block 1314, the multifunctional devices, acting as peers to each other, communicate between themselves and establish roles and responsibilities with respect to the multi-device capable application. A user interface is rendered and updated on each multifunctional device based on local state information at block 1320.

At block 1321, it is checked if any global state update has been received from the peer multifunctional devices, or any local input is received. If there is no global state update or local input received, then the method returns to block 1320 to render and update the user interface based on local state information. Otherwise, if either global state update or local input has been received at block 1321, then the local state information is changed at block 1327.

From block 1327, the method transitions into block 1329 to check if the new local state changes affect the global state. If the new local state changes affect the global state, then the global state changes are sent to the peer multifunctional devices at block 1330, and then the method returns to block 1320. Otherwise, the method returns directly to block 1320 to render and update the user interface based on local and/or global state information.

Figure 14:
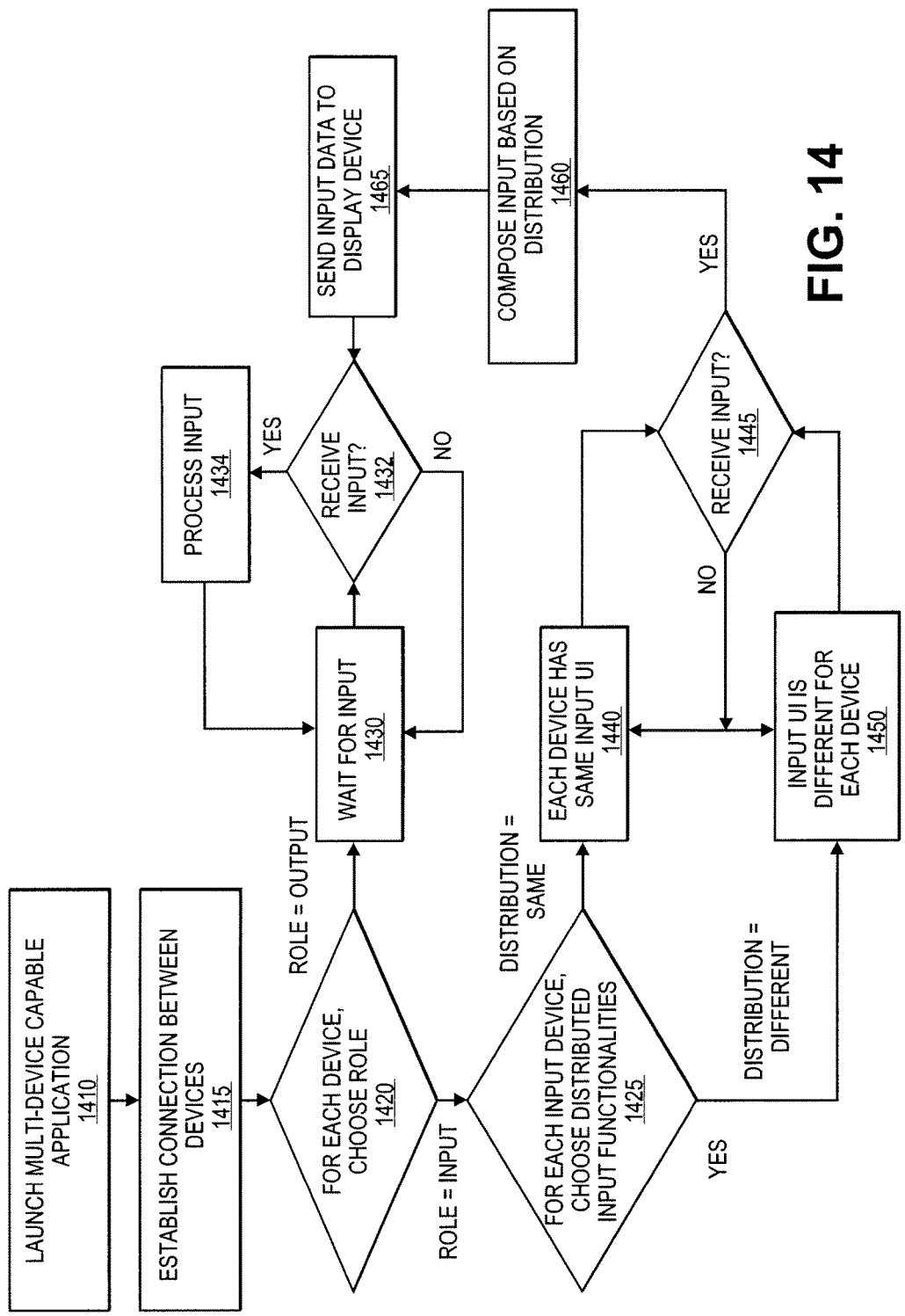
FIG. 14 is a flow chart of a method for providing a distributed input functionality in accordance with one embodiment of the present disclosure.

FIG. 14 is a flow chart of a method for providing a distributed input functionality in accordance with one embodiment of the present disclosure. The method may be performed by hardware, software, firmware, or a combination of any of the above. For example, the method may be performed by the processing device 850 of the multifunctional device 800 illustrated in FIG. 8. Furthermore, the multifunctional device may be a multifunctional device connected to a PAN, where the input functionality is distributed between the multifunctional device and one or more peer devices connected to the PAN. For instance, each multifunctional device may display all or part of an input GUI (e.g., a simulated piano keyboard of a music creation application).

At block 1410, a multi-device capable application is launched on a multifunctional device. Then connections between the multifunctional device and other multifunctional devices are established over a PAN at block 1415. Alternatively, the multifunctional device may connect to the PAN to discover the other multifunctional devices and the services available on them through advertisements or signals sent over the PAN from the other multifunctional devices, without connecting to the other multifunctional devices. Based on the discovery result, the multifunctional device may choose to connect to some or all of the other multifunctional devices over the PAN. The connections may be established according to Bluetooth or other PAN protocols, and the device discovery may be carried out using Bonjour from Apple, Inc. At block 1420, each multifunctional device chooses a role. If the role chosen is output, then the method transitions to block 1430. If the role chosen is input, then the method transitions to block 1425.

At block 1430, the multifunctional device waits for input. Then the multifunctional device checks if any input is received at block 1432. If there is, then the multifunctional device processes the input at block 1434. Otherwise, the multifunctional device returns to block 1430 to wait for input.

At block 1425, each input device chooses distributed input functionalities. If the distribution is the same among the input devices, then the method transitions to block 1440. Otherwise, if the distribution is different, then the method transitions to block 1450. At block 1440, each device has the same input user interface. Then the method checks if there is any input received by the local device or by other devices at block 1445. If there is none, the method returns to block 1440. At block 1450, the input user interface is different for at least two of the devices. For example, two of the devices may have the same input user interface, while a third device may have a different input user interface. Then the method checks if there is any input received at block 1445. If there is none, the method returns to block 1450.

If there is input received at block 1445, the method transitions to block 1460 to compose input based on distribution. Then the input data is sent to a display device at block 1465. In some embodiments, the input received is also sent to other peer devices, which may process the input according to their respective distributed functionalities. From block 1465, the method transitions to block 1432 to continue performing the operations as discussed above.

In some embodiments, the multi-device capable application includes a music composition application and one or more instrument applications. Each of the music composition application and the instrument applications may run on a different multifunctional device. Alternatively, the music composition application and one of the instrument applications may run on the same multifunctional device (i.e., this multifunctional device may serve as both a music composition server and an instrument). The music composition application may collaborate with the instrument applications to create musical pieces based on user inputs. Furthermore, the instrument application may include multiple modules to simulate different types of instruments, such as piano, violin, drum, etc. Each multifunctional device may serve as a different instrument, or multiple multifunctional devices may serve as the same instrument. In some embodiments, a multifunctional device may install all modules of the instrument application. Alternatively, a multifunctional device may install only a subset of the modules of the instrument application depending on the instrument capabilities desired. For example, a multifunctional device designated to serve as a piano may install only modules of the instrument application relevant to piano. The modules may be pre-installed on the multifunctional device, or be downloaded by users of the multifunctional devices over the Internet. In some embodiments, each multifunctional device may serve as the music composition server. For instance, when a multifunctional device serving as the music composition server drops out of the collaboration, another multifunctional device may take over and act as the music composition server. One example is discussed in details below with reference to FIGS. 15 and 16.

Figure 15:
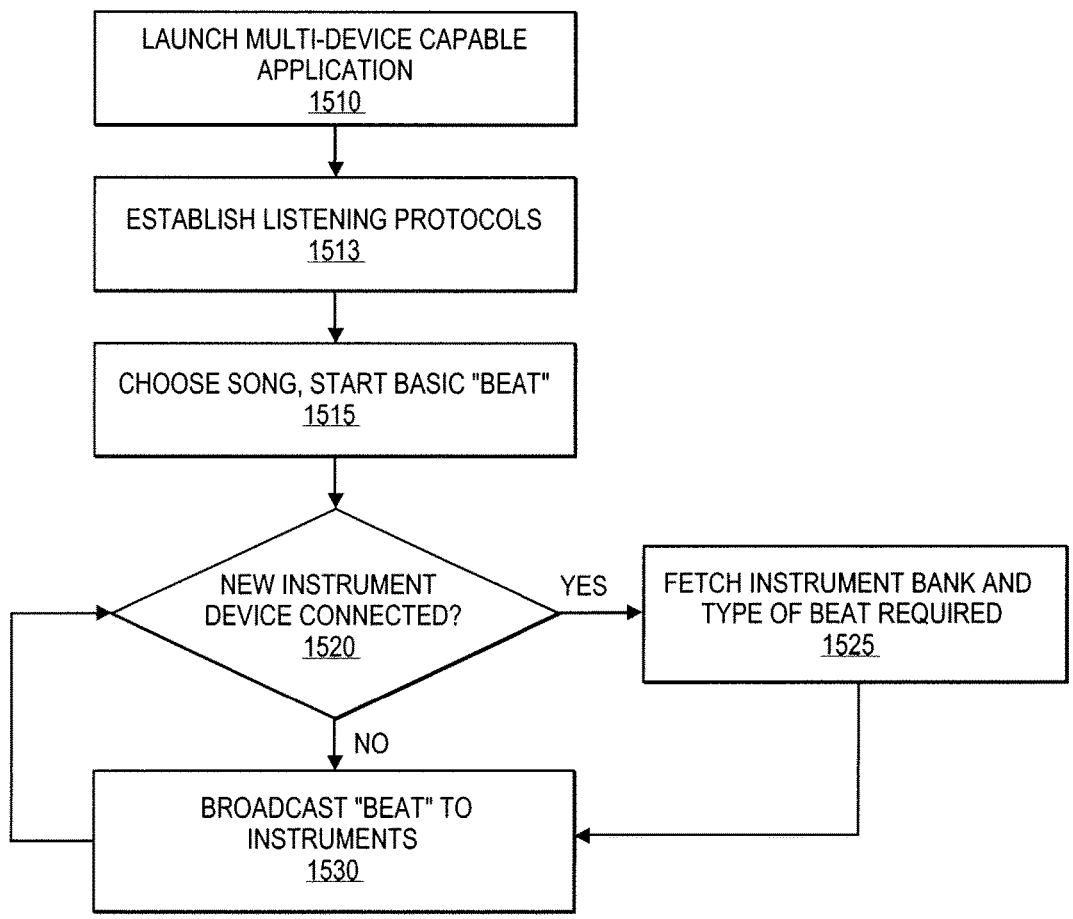
FIG. 15 is a flow chart of a method for providing a Music composition server in accordance with one embodiment of the present disclosure.
Figure 16:
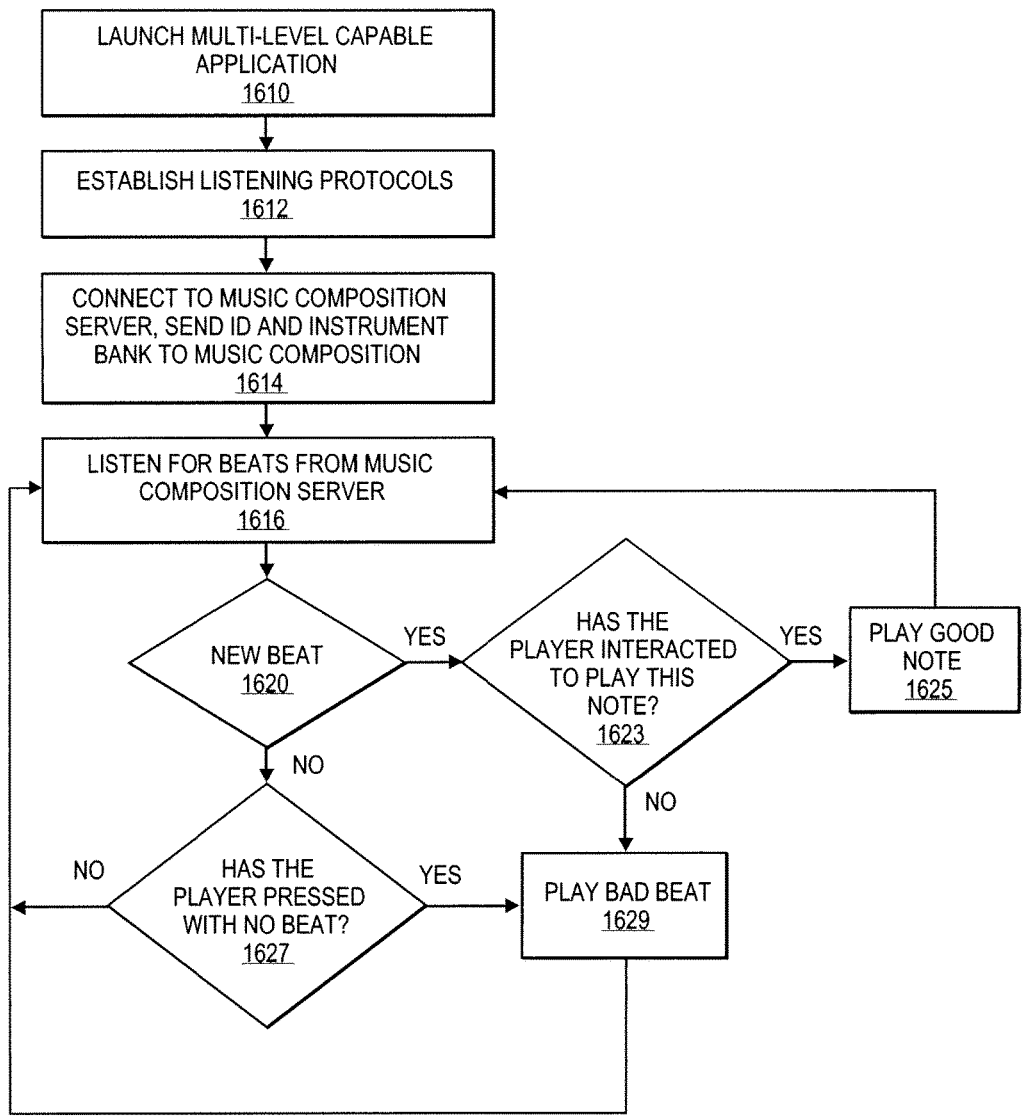
FIG. 16 is a flow chart of a method for providing an Instrument application in accordance with one embodiment of the present disclosure.

FIG. 15 is a flow chart of a method for providing a music composition server in accordance with one embodiment of the present disclosure. FIG. 16 is a flow chart of a method for providing an Instrument application in accordance with one embodiment of the present disclosure. Note that the software running on the music composition server and the Instrument application work together as a multi-device capable application. In other words, the software on the music composition server and instrument application are part of the multi-device capable application. Each of the music composition server and the instrument application may be running on different multifunctional devices connected to a PAN, such as multifunctional devices 710 and 720 in FIG. 7. Alternatively, the music composition server and the instrument application may be running on the same multifunctional device.

Referring to FIG. 15, the multi-device capable application is launched on a multifunctional device acting as the Music composition server at block 1510. Then the multifunctional device establishes listening protocols at block 1513. The listening protocols include procedures for the music composition application and the instrument application to exchange data (e.g., beat). The multifunctional device further chooses song and starts basic beat at block 1515.

At block 1520, the multifunctional device checks if any new instrument device has been connected to the PAN. If there is, then the multifunctional device fetches instrument bank and type of beat required for composing music at block 1525, and then the method transitions into block 1530. Otherwise, if there is no new instrument device connected, then the method transitions into block 1530 directly. At block 1530, the multifunctional device broadcasts the beat to the instruments connected. Then the method returns to block 1520 to repeat the above operations.

Referring to FIG. 16, the multi-device capable application is launched on a multifunctional device acting as the Instrument at block 1610. The multifunctional device then establishes listening protocols at block 1612. At 1614, the multifunctional device connects to the music composition server and sends its identification and instrument bank to the music composition server. For instance, the multifunctional device may use Bonjour to discover the music composition server and the music composition application running on the server. Then the multifunctional device may connect to the music composition server over a PAN.

At block 1616, the multifunctional device listens for beats from the music composition server. The multifunctional device checks if there is any new beat from the music composition server at block 1620. If there is, the method transitions into block 1623. Otherwise, the method transitions into block 1627.

At block 1623, the multifunctional device checks if the player has interacted to play this note. For example, the player may have actuated a user interface control (e.g., a button) on an input user interface to play this note. If the player has interacted to play this note, then the multifunctional device plays a good note at block 1625, and then returns to block 1616. If the player has not interacted to play this note, then the multifunctional device plays a bad beat at block 1629 and returns to block 1616.

If the multifunctional device determines that there is no new beat at block 1620, then the multifunctional device checks if the player has pressed the user interface control with no beat at block 1627. If so, then the multifunctional device plays a bad beat at block 1629 and then returns to block 1616. Otherwise, the multifunctional device returns directly to block 1616.

Figure 17:
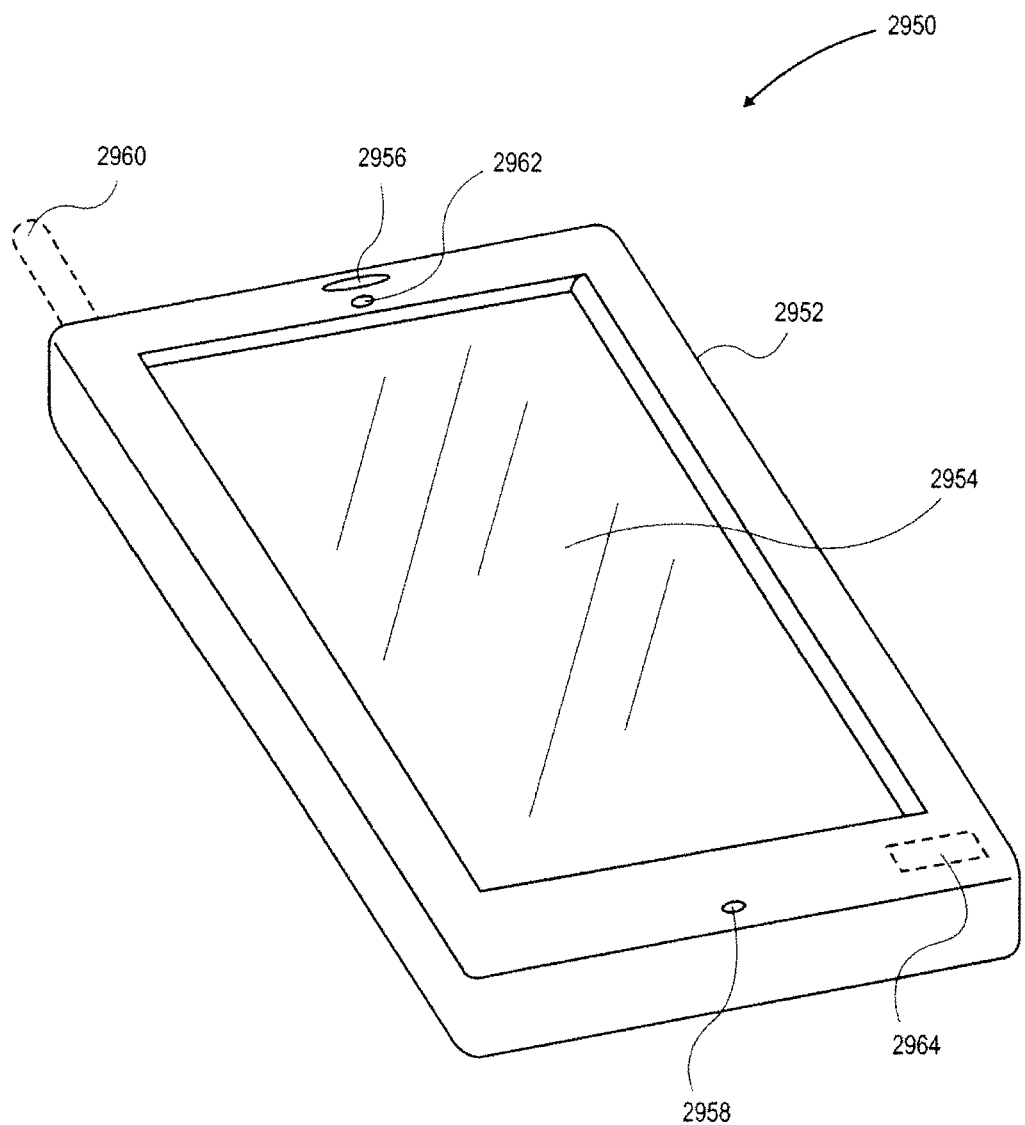
FIG. 17 is a perspective view of a device in accordance with one embodiment of the present disclosure.
Figure 18:
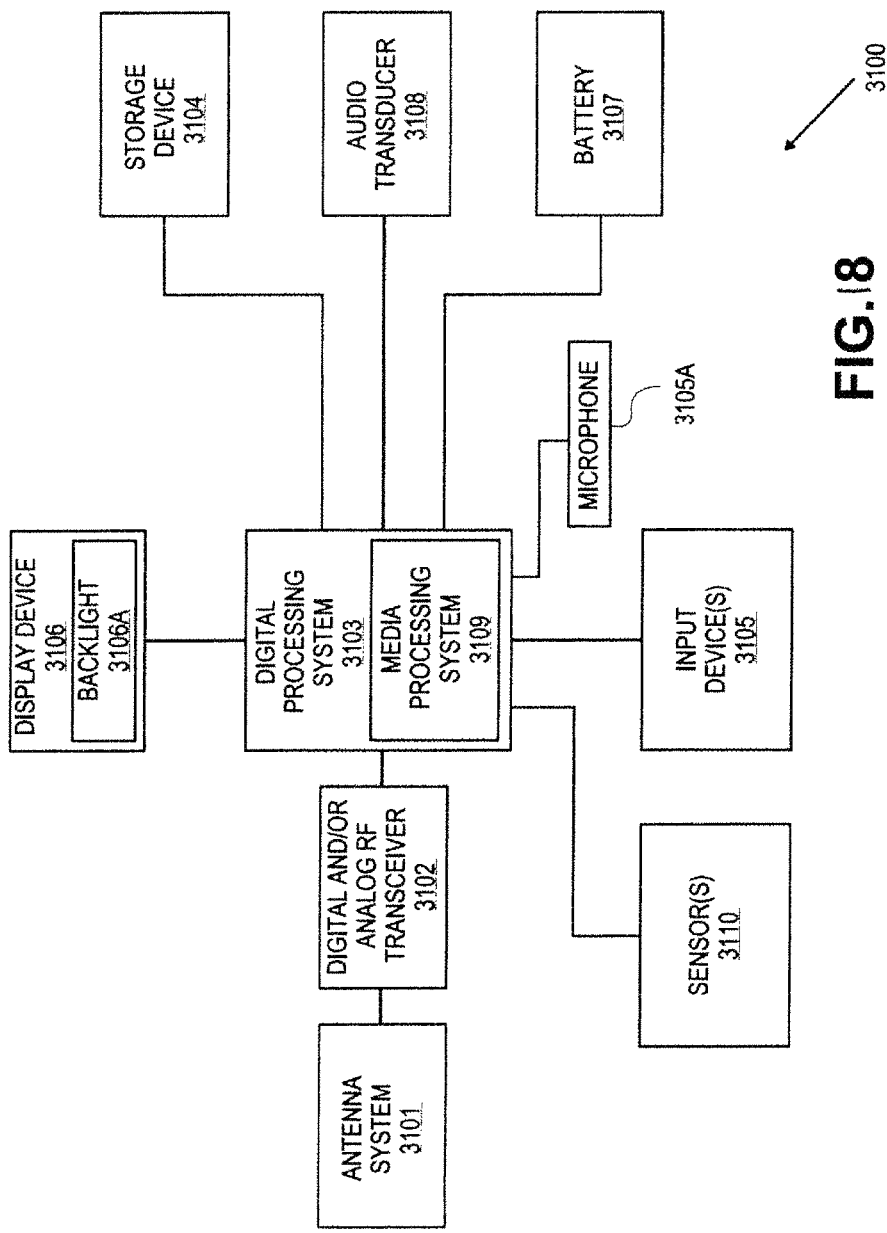
FIG. 18 shows an embodiment of a wireless device which includes the capability for wireless communication.
Figure 19:
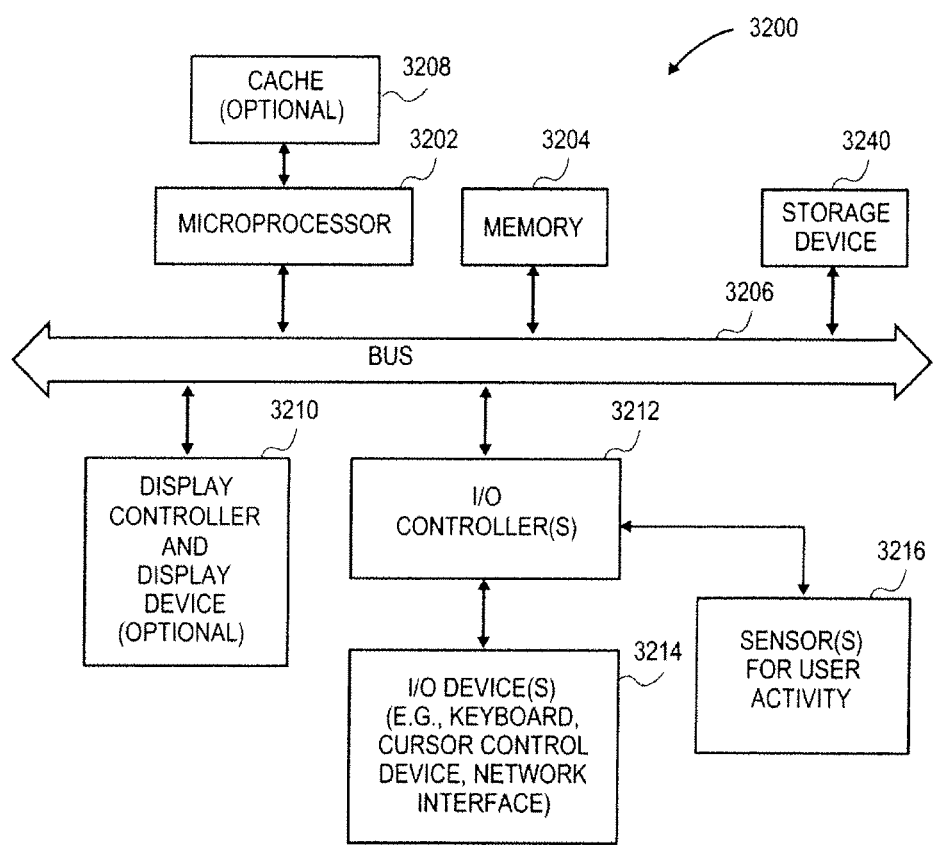
FIG. 19 shows another example of a device in accordance with one embodiment of the present disclosure.

In some embodiments, the methods, systems, and apparatuses of the present disclosure can be implemented in various devices including electronic devices, consumer devices, data processing devices, desktop computers, portable computers, wireless devices, cellular devices, tablet devices, handheld devices, multi touch devices, multi touch data processing devices, any combination of these devices, or other like devices. FIGS. 17-19 illustrate examples of a few of these devices.

FIG. 17 shows a device 2950 in accordance with one embodiment of the disclosure. The device 2950 may include a housing 2952, a display/input device 2954, a speaker 2956, a microphone 2958 and an optional antenna 2960 (which may be visible on the exterior of the housing or may be concealed within the housing). The device 2950 also may include a proximity sensor 2962 and an accelerometer 2964. The device 2950 may be a cellular telephone or a device which is an integrated PDA and a cellular telephone or a device which is an integrated media player and a cellular telephone or a device which is both an entertainment system (e.g. for playing games) and a cellular telephone, or the device 2950 may be other types of devices described herein. In one particular embodiment, the device 2950 may include a cellular telephone and a media player and a PDA, all contained within the housing 2952. The device 2950 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer, an iPhone®, and an iPod® are portable devices.

In certain embodiments of the present disclosure, the device 2950 can be used to implement at least some of the methods discussed in the present disclosure.

FIG. 18 shows an embodiment of a wireless device which includes the capability for wireless communication. Wireless device 3100 may include an antenna system 3101. Wireless device 3100 may also include a digital and/or analog radio frequency (RF) transceiver 3102, coupled to the antenna system 3101, to transmit and/or receive voice, digital data and/or media signals through antenna system 3101.

Wireless device 3100 may also include a digital processing system 3103 to control the digital RF transceiver and to manage the voice, digital data and/or media signals. Digital processing system 3103 may be a general purpose processing device, such as a microprocessor or controller for example. Digital processing system 3103 may also be a special purpose processing device, such as an ASIC (application specific integrated circuit), FPGA (field-programmable gate array) or DSP (digital signal processor). Digital processing system 3103 may also include other devices, as are known in the art, to interface with other components of wireless device 3100. For example, digital processing system 3103 may include analog-to-digital and digital-to-analog converters to interface with other components of wireless device 3100. Digital processing system 3103 may include a media processing system 3109, which may also include a general purpose or special purpose processing device to manage media, such as files of audio data.

Wireless device 3100 may also include a storage device 3104, coupled to the digital processing system, to store data and/or operating programs for the Wireless device 3100. Storage device 3104 may be, for example, any type of solid-state or magnetic memory device. Storage device 3104 may be or include a machine-readable medium.

Wireless device 3100 may also include one or more input devices 3105, coupled to the digital processing system 3103, to accept user inputs (e.g., telephone numbers, names, addresses, media selections, etc.) Input device 3105 may be, for example, one or more of a keypad, a touchpad, a touch screen, a pointing device in combination with a display device or similar input device.

Wireless device 3100 may also include at least one display device 3106, coupled to the digital processing system 3103, to display information such as messages, telephone call information, contact information, pictures, movies and/or titles or other indicators of media being selected via the input device 3105. Display device 3106 may be, for example, an LCD display device. In one embodiment, display device 3106 and input device 3105 may be integrated together in the same device (e.g., a touch screen LCD such as a multi-touch input panel which is integrated with a display device, such as an LCD display device). The display device 3106 may include a backlight 3106A to illuminate the display device 3106 under certain circumstances. It will be appreciated that the Wireless device 3100 may include multiple displays.

Wireless device 3100 may also include a battery 3107 to supply operating power to components of the system including digital RF transceiver 3102, digital processing system 3103, storage device 3104, input device 3105, microphone 3105A, audio transducer 3108, media processing system 3109, sensor(s) 3110, and display device 3106. Battery 3107 may be, for example, a rechargeable or non-rechargeable lithium or nickel metal hydride battery. Wireless device 3100 may also include audio transducers 3108, which may include one or more speakers, and at least one microphone 3105A. In certain embodiments of the present disclosure, the wireless device 3100 can be used to implement at least some of the methods discussed in the present disclosure.

FIG. 19 shows another example of a device according to an embodiment of the disclosure. This device 3200 may include a processor, such as microprocessor 3202, and a memory 3204, which are coupled to each other through a bus 3206. The device 3200 may optionally include a cache 3208 which is coupled to the microprocessor 3202. The device may optionally includes a storage device 3240 which may be, for example, any type of solid-state or magnetic memory device. Storage device 3240 may be or include a machine-readable medium.

This device may also optionally include a display controller and display device 3210 which is coupled to the other components through the bus 3206. One or more input/output controllers 3212 are also coupled to the bus 3206 to provide an interface for input/output devices 3214 and to provide an interface for one or more sensors 3216 which are for sensing user activity. The bus 3206 may include one or more buses connected to each other through various bridges, controllers, and/or adapters as is well known in the art. The input/output devices 3214 may include a keypad or keyboard or a cursor control device such as a touch input panel. Furthermore, the input/output devices 3214 may include a network interface which is either for a wired network or a wireless network (e.g. an RF transceiver). The sensors 3216 may be any one of the sensors described herein including, for example, a proximity sensor or an ambient light sensor. In at least certain implementations of the device 3200, the microprocessor 3202 may receive data from one or more sensors 3216 and may perform the analysis of that data in the manner described herein.

In certain embodiments of the present disclosure, the device 3200 or device 3100 or combinations of devices 3100 and 3200 can be used to implement at least some of the methods discussed in the present disclosure.

Some portions of the detailed descriptions are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory machine-readable storage medium storing executable program instructions which when executed by a data processing system cause the data processing system to perform a method comprising:
    detecting, by a first device connected to a personal area network (PAN), a second device connected to the PAN that shares a collaborative application with the first device;
    establishing, by the first device, a first connection for transferring data to the second device;
    determining a role from a plurality of roles, by a configuration module, for the first device, wherein the plurality of roles include a dedicated input and a dedicated output, wherein each device associated with the collaborative application is assigned a specific role, and wherein the assigned role for each device is modified in response to a predetermined condition while the collaborative application is in operation;
    configuring, by the first device, the first device as a dedicated input device for the collaborative application based on the determined role;
    receiving, by the first device, data through a user interface for the collaborative application; and
    transmitting, by the first device to the second device through the first connection, the data for processing by the collaborative application on the second device.

2. The non-transitory machine-readable storage medium of claim 1, wherein the method further comprises:
    configuring, by the second device, the second device to execute a pre-determined portion of the collaborative application in response to receiving the data.

3. The non-transitory machine-readable storage medium of claim 1, wherein the method further comprises:
    configuring, by the second device, the second device as a dedicated audio output device for the collaborative application.

4. The non-transitory machine-readable storage medium of claim 1, wherein the method further comprises:
    configuring, by the second device, the second device as a dedicated video output device for the collaborative application.

5. The non-transitory machine-readable storage medium of claim 1, wherein the method further comprises:
    determining, by the first device, whether a second connection can be established using voice chat software executing on the first and second devices, the second connection to provide a voice chat service between the first and second devices; and
    transferring, by the first device, a first function call from the voice chat service to the collaborative application on the second device to request use of the first connection to transfer messages for the voice chat service concurrently with the first connection transferring the data for the collaborative application if the second connection cannot be established.

6. The non-transitory machine-readable storage medium of claim 5, wherein the method further comprises:
    establishing, by the first device, the voice chat across the second connection if the second connection is successfully established.

7. The non-transitory machine-readable storage medium of claim 1, wherein detecting by the first device comprises:
    discovering, by the first device, services available from devices through the PAN without establishing a connection with any one of devices, wherein the discovered services include the collaborative application on the second device; and
    selecting, by the first device, the second device based on the discovered services.

8. The non-transitory machine-readable storage medium of claim 7, wherein the selecting is in response to receiving a choice of the second device from a human-readable list of the discovered services.

9. The non-transitory machine-readable storage medium of claim 1, wherein the first device configured as the dedicated input device includes an accessory device.

10. The non-transitory machine-readable storage medium of claim 1, wherein the predetermined condition comprises: addition of a multifunctional device to the PAN, or removal of a multifunctional device from the PAN, or a current state of execution of the collaborative application.

11. A computer-implemented method comprising:
    detecting, by a first device connected to a personal area network (PAN), a second device connected to the PAN that shares a collaborative application with the first device;
    establishing, by the first device, a first connection for transferring data to the second device;
    determining a role from a plurality of roles, by a configuration module, for the first device, wherein the plurality of roles include a dedicated input and a dedicated output, wherein each device associated with the collaborative application is assigned a specific role, and wherein the assigned role for each device is modified in response to a predetermined condition while the collaborative application is in operation;
    configuring, by the first device, the first device as a dedicated input device for the collaborative application based on the determined role;

receiving, by the first device, data through a user interface for the collaborative application; and transmitting, by the first device to the second device through the first connection, the data for processing by the collaborative application on the second device.

12. The computer-implemented method of claim 11 further comprising:

configuring, by the second device, the second device to execute a pre-determined portion of the collaborative application in response to receiving the data.

13. The computer-implemented method of claim 11 further comprising:

configuring, by the second device, the second device as a dedicated audio output device for the collaborative application.

14. The computer-implemented method of claim 11 further comprising:

configuring, by the second device, the second device as a dedicated video output device for the collaborative application.

15. The computer-implemented method of claim 11 further comprising:

determining, by the first device, whether a second connection can be established using voice chat software executing on the first and second devices, the second connection to provide a voice chat service between the first and second devices; and transferring, by the first device, a first function call from the voice chat service to the collaborative application on the second device to request use of the first connection to transfer messages for the voice chat service concurrently with the first connection transferring the data for the collaborative application if the second connection cannot be established.

16. The computer-implemented method of claim 15 further comprising:

establishing, by the first device, the voice chat across the second connection if the second connection is successfully established.

17. The computer-implemented method of claim 11, wherein detecting by the first device comprises:

discovering, by the first device, services available from devices through the PAN without establishing a connection with any one of devices, wherein the discovered services include the collaborative application on the second device; and selecting, by the first device, the second device based on the discovered services.

18. The computer-implemented method of claim 17, wherein selecting by the first device is in response to receiving a choice of the second device from a human-readable list of the discovered services.

19. The computer-implemented method of claim 11, wherein the predetermined condition comprises: addition of a multifunctional device to the PAN, or removal of a multifunctional device from the PAN, or a current state of execution of the collaborative application.

20. A system comprising:

a processor coupled to a network interface through a bus, the network interface for connecting the processor to a personal area network (PAN); and a memory coupled to the processor through the bus, the memory storing executable program instructions which when executed by the processor cause the processor to detect a second device connected to the PAN that shares a collaborative application with a first device, establish a first connection for transferring data to the second device through the network interface, determining a role from a plurality of roles, by a configuration module, for the first device, wherein the plurality of roles include a dedicated input and a dedicated output, wherein each device associated with the collaborative application is assigned a specific role, and wherein the assigned role for each device is modified in response to a predetermined condition while the collaborative application is in operation;

configure the processor as a dedicated input device for the collaborative application based on the determined role based on the determined role;

receive data through a user interface for the collaborative application; and transmit through the first connection the data for processing by the collaborative application on the second device.

21. The system of claim 20, wherein the instructions further cause the processor to:

determine whether a second connection can be established using voice chat software executing on the first and second device, the second connection to provide a voice chat service between the first and second devices; and transfer a first function call from the voice chat service to the collaborative application on the second device to request use of the first connection to transfer messages for the voice chat service concurrently with the first connection transferring the data for the collaborative application if the second connection cannot be established.

22. The system of claim 21, wherein the instructions further cause the processor to establish the voice chat across the second connection if the second connection is successfully established.

23. The system of claim 20, wherein the detecting causes the processor to:

discover services available from devices through the PAN without establishing a connection with any one of devices, wherein the discovered services include the collaborative application on the second device; and select the second device based on the discovered services.

24. The system of claim 23, wherein the selecting is in response to receiving a choice of the second device from a human-readable list of the discovered services.

25. The system of claim 20, wherein the predetermined condition comprises: addition of a multifunctional device to the PAN, or removal of a multifunctional device from the PAN, or a current state of execution of the collaborative application.

* * * * *